(12) United States Patent
Clemm et al.

(10) Patent No.: US 10,389,630 B2
(45) Date of Patent: Aug. 20, 2019

(54) MONITORING, MEASURING, ANALYZING COMMUNICATION FLOWS BETWEEN IDENTITIES IN AN IDENTITY-ENABLED NETWORK USING IPFIX EXTENSIONS

(71) Applicant: Futurewei Technologies, Inc., Plano, TX (US)

(72) Inventors: Alexander Clemm, Los Gatos, CA (US); Padmadevi Pillay-Esnault, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 26 days.

(21) Appl. No.: 15/640,087

(22) Filed: Jun. 30, 2017

(65) Prior Publication Data

US 2019/0007313 A1 Jan. 3, 2019

(51) Int. Cl.
| | | |
|---|---|---|
| *H04L 12/26* | (2006.01) |
| *H04W 28/08* | (2009.01) |
| *H04W 40/02* | (2009.01) |
| *H04W 72/04* | (2009.01) |
| *H04L 12/721* | (2013.01) |

(52) U.S. Cl.
CPC .......... *H04L 45/72* (2013.01); *H04L 43/0876* (2013.01); *H04L 45/38* (2013.01); *H04W 28/08* (2013.01); *H04L 43/0888* (2013.01); *H04L 43/12* (2013.01); *H04W 40/02* (2013.01); *H04W 72/04* (2013.01)

(58) Field of Classification Search
CPC .......... H04L 45/72; H04L 4/38; H04W 28/08
See application file for complete search history.

(56) References Cited

U.S. PATENT DOCUMENTS 9,979,624 B1 * 5/2018 Volpe .................. H04L 43/0894
2004/0158644 A1 * 8/2004 Albuquerque .......... H04L 41/08
709/238

(Continued)

OTHER PUBLICATIONS

Claise, B,, et al., "Specification of the IP Flow Information Export (IPFIX) Protocol for the Exchange of Flow Information", RFC 7011, Internet Engineering Task Force (IETF), (Sep. 2013), 76 pgs.

(Continued)

*Primary Examiner* — Mohammad S Anwar
(74) *Attorney, Agent, or Firm* — Schwegman Lundberg & Woessner, P.A.

(57) ABSTRACT

A computer-implemented method of monitoring communication flows between identities is provided that comprises: accessing a first data packet that indicates a source identifier, a destination identifier, a first source locator, and a first destination locator; accessing a second data packet that indicates the source identifier, the destination identifier, a second source locator, and a second destination locator, the second destination locator being different from the first destination locator; storing data regarding the first data packet and the second data packet in a single ID flow record based on a determination that the source identifier of the first data packet matches the source identifier of the second data packet and a determination that the destination identifier of the first data packet matches the destination identifier of the second data packet; and based on the single ID flow record, adjusting a resource allocation.

18 Claims, 16 Drawing Sheets

(56) References Cited

U.S. PATENT DOCUMENTS

| | | |
|---|---|---|
| 2010/0046377 A1 | 2/2010 | Ryan et al. |
| 2011/0069666 A1* | 3/2011 | Kahn .................... H04W 72/10 |
| | | 370/329 |
| 2014/0136680 A1* | 5/2014 | Joshi .................... H04L 43/026 |
| | | 709/224 |
| 2015/0124826 A1* | 5/2015 | Edsall ................. H04L 12/4633 |
| | | 370/392 |
| 2017/0093681 A1 | 3/2017 | Chaubey et al. |
| 2017/0317941 A1 | 11/2017 | Eggleston et al. |
| 2018/0191681 A1 | 7/2018 | Mihelich et al. |
| 2019/0007326 A1 | 1/2019 | Clemm et al. |

OTHER PUBLICATIONS

Claise, B., "Information Model for IP Flow Information Export (IPFIX)", RFC 7012, Internet Engineering Task Force (IETF), (Sep. 2013), 24 pgs.
"U.S. Appl. No. 15/640,125, Non Final Office Action dated Sep. 5, 2018", (Sep. 5, 2018), 18 pgs.
"U.S. Appl. No. 15/640,125, Response filed Dec. 12, 2018 to Non Final Office Action dated Sep. 5, 2018", 11 pgs.
"U.S. Appl. No. 15/640,125, Notice of Allowance dated Feb. 1, 2019", 9 pgs.

* cited by examiner

MONITORING, MEASURING, ANALYZING COMMUNICATION FLOWS BETWEEN IDENTITIES IN AN IDENTITY-ENABLED NETWORK USING IPFIX EXTENSIONS

TECHNICAL FIELD

The present disclosure is related to identity-oriented networks (IONs) and, in one particular embodiment, to monitoring, measuring, and analyzing communication flows between identities in an ION using Internet protocol (IP) flow information export (IPFIX) extensions.

BACKGROUND

In IP networks, data packets are addressed to an IP address of a destination endpoint. The IP address not only identifies the destination endpoint but is a locator used for routing the data packets to the destination endpoint. As a result, if the destination endpoint changes IP addresses (e.g., due to disconnecting from the network and reconnecting via a different access point), packets addressed to the original IP address will not reach the destination.

In IONs, data packets are addressed to an identifier of a destination endpoint. Identifiers are long-lived and tied to the endpoint identity rather than the location of the endpoint. Generic Resilient Identity Services (GRIDS) may be used to enable mapping of locators to identifiers (e.g., by a mapping server (GRIDS-MS)). When an endpoint changes locations, it informs the GRIDS-MS. Thus, the GRIDS-MS may send the updated location to any other endpoints that wish to continue communicating with the endpoint that moved.

IPFIX and Netflow are technologies used to collect data about IP flows in a network. Netflow is a proprietary protocol developed by Cisco, but is similar in feature set to IPFIX. IPFIX will be used herein to refer to either technology. IP flow records are used for a variety of purposes including network security, accounting, identifying top users of resources, network planning, and service level assurance, among others. For example, IP flow records may be used for network security by allowing comparison of actual IP flows with flow threat profiles. IP flow records may be used for network accounting by allowing measure of communication volume and duration. IP flow records may be used for service level assurance by allowing assessment of which flows are affected by packet drops to determine if the affected flows have something in common that can be addressed. IP flows may be used for network planning by identifying who talks to whom, and thus which network connections are candidates for improvement.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, a computer-implemented method of monitoring communication flows between identities is provided that comprises: accessing, by one or more processors of a router, a first data packet that indicates a source identifier, a destination identifier, a first source locator, and a first destination locator; accessing, by the one or more processors of the router, a second data packet that indicates the source identifier, the destination identifier, a second source locator, and a second destination locator, the second destination locator being different from the first destination locator; storing, by the one or more processors of the router, data regarding the first data packet and the second data packet in a single ID flow record based on a determination that the source identifier of the first data packet matches the source identifier of the second data packet and a determination that the destination identifier of the first data packet matches the destination identifier of the second data packet; and based on the single ID flow record, adjusting, by one or more processors of a detector, a resource allocation.

Optionally, in any of the preceding aspects, the single ID flow record includes the source identifier, the destination identifier, and a sum of sizes of the first data packet and the second data packet.

Optionally, in any of the preceding aspects, the method further comprises: accessing a first hash, the first hash having been generated from the source identifier of the first data packet; accessing a second hash, the second hash having been generated from the source identifier of the second data packet; accessing a third hash, the third hash having been generated from the destination identifier of the first data packet; and accessing a fourth hash, the fourth hash having been generated from the destination identifier of the second data packet; the single ID flow record includes the first hash, the third hash, and a sum of sizes of the first data packet and the second data packet; the determination that the source identifier of the first data packet matches the source identifier of the second data packet comprises determining that the stored first hash matches the second hash; and the determination that the destination identifier of the first data packet matches the destination identifier of the second data packet comprises determining that the stored third hash matches the fourth hash.

Optionally, in any of the preceding aspects, the accessing of the first hash comprises generating the first hash from the source identifier of the first data packet using a hashing algorithm; the accessing of the second hash comprises generating the second hash from the destination identifier of the first data packet using the hashing algorithm; the accessing of the third hash comprises generating the third hash from the source identifier of the second data packet using the hashing algorithm; and the accessing of the fourth hash comprises generating the fourth hash from the destination identifier of the second data packet using the hashing algorithm.

Optionally, in any of the preceding aspects, the source identifier and the destination identifier are variable-length identifiers; the generating of the first hash comprises generating a fixed-length hash of the source identifier of the first data packet; and the generating of the third hash comprises generating a fixed-length hash of the destination identifier of the first data packet.

Optionally, in any of the preceding aspects, the accessing of the first hash comprises retrieving, from a database, a predetermined hash of the source identifier of the first data packet; the accessing of the second hash comprises retrieving, from the database, a predetermined hash of the source identifier of the second data packet; the accessing of the third hash comprises retrieving, from the database, a predetermined hash of the destination identifier of the first data packet; and the accessing of the fourth hash comprises retrieving, from the database, a predetermined hash of the destination identifier of the second data packet.

Optionally, in any of the preceding aspects, the method further comprises: generating, based on an analysis of the ID flow record, an Internet protocol flow information export (IPFIX) message; and transmitting the generated IPFIX message over a network to the detector.

Optionally, in any of the preceding aspects, the second source locator is different from the first source locator.

Optionally, in any of the preceding aspects, the adjusting of the resource allocation comprises denying a request for a locator from a mapping server made by the source.

Optionally, in any of the preceding aspects, the adjusting of the resource allocation comprises increasing network bandwidth on a network path between the source and the destination.

Optionally, in any of the preceding aspects, the adjusting of the resource allocation comprises decreasing network bandwidth on a network path between the source and the destination.

According to one aspect of the present disclosure, an Internet protocol flow information export (IPFIX) router is provided that comprises: a memory storage comprising instructions; and one or more processors in communication with the memory storage, wherein the one or more processors execute the instructions to perform: accessing, by one or more processors, a first data packet that indicates a source identifier, a destination identifier, a first source locator, and a first destination locator; accessing, by the one or more processors, a second data packet that indicates the source identifier, the destination identifier, a second source locator, and a second destination locator, the second destination locator being different from the first destination locator; and storing, by the one or more processors of the router, data regarding the first data packet and the second data packet in a single ID flow record based on a determination that the source identifier of the first data packet matches the source identifier of the second data packet and a determination that the destination identifier of the first data packet matches the destination identifier of the second data packet.

Optionally, in any of the preceding aspects, the single ID flow record includes the source identifier, the destination identifier, and a sum of sizes of the first data packet and the second data packet.

Optionally, in any of the preceding aspects, the one or more processors further perform: accessing a first hash, the first hash having been generated from the source identifier of the first data packet; accessing a second hash, the second hash having been generated from the source identifier of the second data packet; accessing a third hash, the third hash having been generated from the destination identifier of the first data packet; and accessing a fourth hash, the fourth hash having been generated from the destination identifier of the second data packet; the single ID flow record includes the first hash, the third hash, and a sum of sizes of the first data packet and the second data packet; the determination that the source identifier of the first data packet matches the source identifier of the second data packet comprises determining that the stored first hash matches the second hash; and the determination that the destination identifier of the first data packet matches the destination identifier of the second data packet comprises determining that the stored third hash matches the fourth hash.

Optionally, in any of the preceding aspects, the accessing of the first hash comprises generating the first hash from the source identifier of the first data packet using a hashing algorithm; the accessing of the second hash comprises generating the second hash from the destination identifier of the first data packet using the hashing algorithm; the accessing of the third hash comprises generating the third hash from the source identifier of the second data packet using the hashing algorithm; and the accessing of the fourth hash comprises generating the fourth hash from the destination identifier of the second data packet using the hashing algorithm.

Optionally, in any of the preceding aspects, the source identifier and the destination identifier are variable-length identifiers; the generating of the first hash comprises generating a fixed-length hash of the source identifier of the first data packet; and the generating of the third hash comprises generating a fixed-length hash of the destination identifier of the first data packet.

Optionally, in any of the preceding aspects, the accessing of the first hash comprises retrieving, from a database, a predetermined hash of the source identifier of the first data packet; the accessing of the second hash comprises retrieving, from the database, a predetermined hash of the source identifier of the second data packet; the accessing of the third hash comprises retrieving, from the database, a predetermined hash of the destination identifier of the first data packet; and the accessing of the fourth hash comprises retrieving, from the database, a predetermined hash of the destination identifier of the second data packet.

Optionally, in any of the preceding aspects, the second source locator is different from the first source locator.

According to one aspect of the present disclosure, a non-transitory computer-readable medium is provided that stores computer instructions for monitoring communication flows between identities, that when executed by one or more processors of a router, cause the one or more processors to perform steps of: accessing a first data packet that indicates a source identifier, a destination identifier, a first source locator, and a first destination locator; accessing a second data packet that indicates the source identifier, the destination identifier, a second source locator, and a second destination locator, the second destination locator being different from the first destination locator; and storing data regarding the first data packet and the second data packet in a single ID flow record based on a determination that the source identifier of the first data packet matches the source identifier of the second data packet and a determination that the destination identifier of the first data packet matches the destination identifier of the second data packet.

Optionally, in any of the preceding aspects, the single ID flow record includes the source identifier, the destination identifier, and a sum of sizes of the first data packet and the second data packet.

Any one of the foregoing examples may be combined with any one or more of the other foregoing examples to create a new embodiment within the scope of the present disclosure.

DETAILED DESCRIPTION

Figure 1:
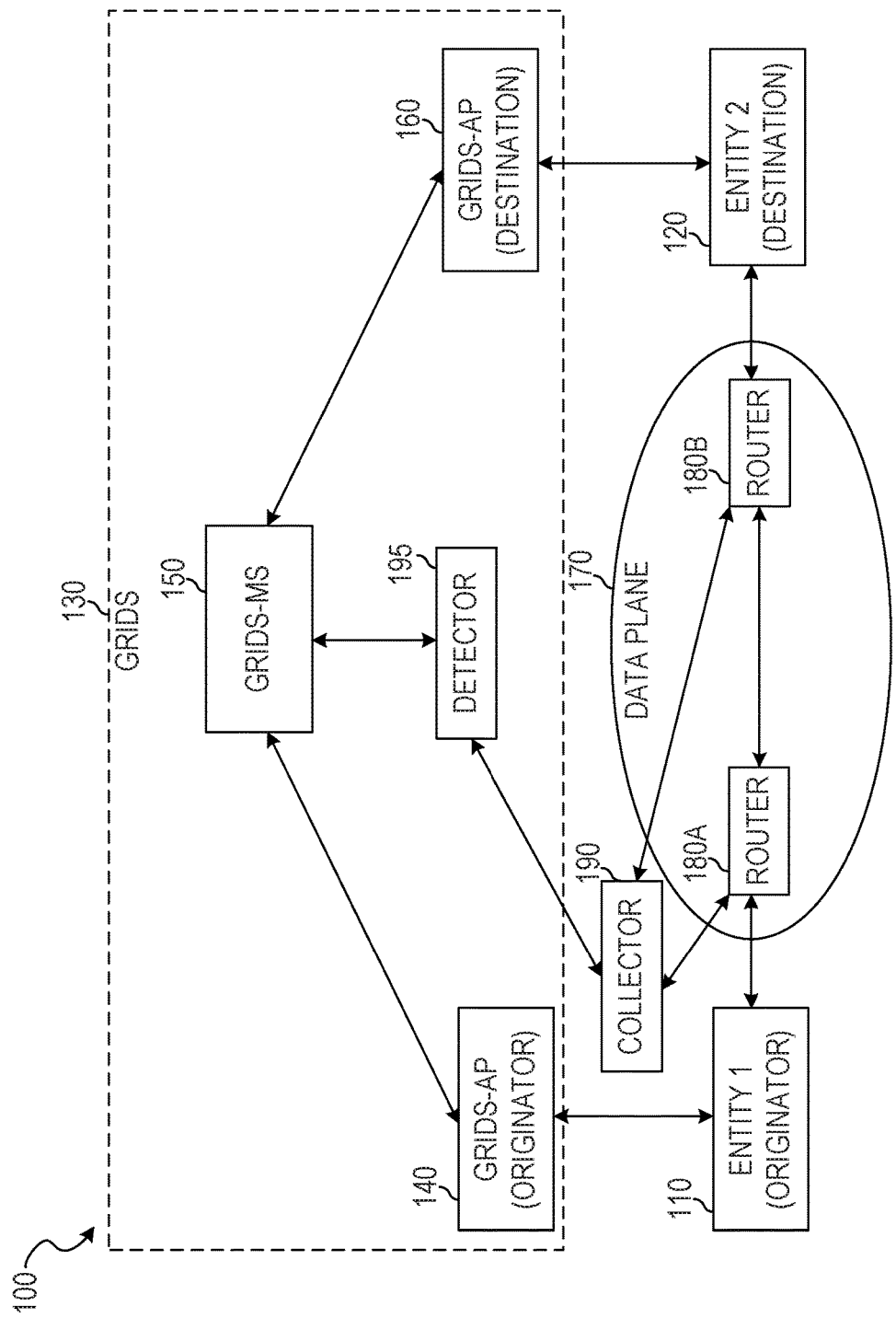
FIG. 1 is an illustration of an example network organization for monitoring, measuring, and analyzing communication flows between identities in an ION using IPFIX extensions, according to some example embodiments.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

Communication flows between communication endpoints can involve IP address changes resulting in fragmented IP flow records in IPFIX. For example, a mobile device may change access points, resulting in a handover from a first access point to a second access point of the mobile device. The mobile device may be assigned a new IP address after the handover. Thus, IPFIX will record separate IP flows for communication with the mobile device, one for each of the two IP addresses resulting from the use of the different access points. As another example, a multi-homed device that accesses a network through multiple IP addresses may have switchovers or concurrent or overlapping flows, each of which will generate its own IP flow record.

To analyze the flow of a communication between two endpoints using IP flow records, wherein IP changes have occurred during the communication flow, multiple IP flow records are aggregated. The multiple IP flow records that belong to the same communication flow are aggregated using stitching logic. Context information not stored in the IP flow records may be needed to perform the stitching, such as IP lease information (e.g., data showing a time range that a particular IP address was assigned to a particular endpoint) to associate IP addresses with communication endpoints. The IP lease information may include start and stop times of the lease, which can be compared with the start and stop times of the IP flows to determine if the IP address of the IP flow was leased to an endpoint of the communication flow at the time of the IP flow.

In some example embodiments, IPFIX is extended by adding two new information elements that can serve as flow keys. These additional information elements for IPFIX, and the related processing features for them, are termed "IPFIX extensions." A SourceID information element stores an identifier of the source communication endpoint for a flow. A DestinationID information element stores an identifier of the destination communication endpoint for a flow. The SourceID and DestinationID may store identifiers used in an ION. In some example embodiments, identifiers are 128-bit fields. In other example embodiments, identifiers are variable-length strings.

Through the use of the SourceID and the Destination ID as part of a flow key, an ID Flow that aggregates flow data statistics for a communication flow between communication endpoints may be generated. Compared to an IP flow that aggregates flow data statistics for a communication flow between IP address pairs, the ID flow records aggregate flow data across IP flow fragments of a given ID flow. This results from the flow records no longer being distinguished by IP address. Compared to an IP flow, an ID flow may reduce data storage usage by avoiding storage of common flow keys such as the input interface (inIf), the source port (srcPort), destination port (destPort), or any suitable combination thereof.

In some example embodiments, a SourceIdHash information element stores a fixed-length hash (e.g., a 32-bit hash) of the source identifier and a DestinationIdHash information element stores a fixed-length hash of the destination identifier. The SourceIdHash and DestinationIdHash information elements may serve as alternative flow keys. An IdFlow server may perform a hash lookup in an identifier cache for any identifier detected in a new flow and, in case of a cache miss, compute the hash for the identifier and add it to the identifier cache.

The use of a non-reversible hash in the ID flow may provide greater security by anonymizing the identifiers. A hash server may cache the hash results in a hash/identifier database table, allowing authorized users to determine the identifiers for the ID flow. The use of a hash may also facilitate support for variable-length identifiers by allowing use of a simpler record structure making use of fixed-length hashes instead of the variable-length identifiers. Thus, the record structure may make use of easier-to-handle fixed-length values even while variable-length identifiers are used. A hash may also be smaller than an identifier (e.g., 32 bits instead of 128 or 512 bits) and thus reduce the size of ID flow records.

IPFIX records may be used in adjusting the allocation of resources. As used herein, a resource refers to any networking resource (such as bandwidth, transmission priority, access to a mapping server, or any suitable combination thereof). Thus, based on IPFIX records, additional or fewer computing resources may be allocated to an endpoint, additional or fewer network resources may be allocated to the endpoint or to intermediate routers, or any suitable combination thereof.

FIG. 1 is an illustration of an example network organization 100 for monitoring, measuring, and analyzing communication flows between identities in an ION using IPFIX extensions, according to some example embodiments. The example network organization 100 includes a first entity 110, a second entity 120, a data plane 170, a GRIDS network 130, and a collector 190. The GRIDS network 130 comprises a GRIDS access point (AP) 140, a GRIDS-AP 160, a GRIDS-MS 150, and a detector 195. The data plane 170 includes routers 180A and 180B.

The entity 110 may register with the originating GRIDS-AP 140, allowing the entity 110 to communicate via the GRIDS network 130. Similarly, the entity 120 may register with the destination GRIDS-AP 160. To communicate with the entity 120, the entity 110 may request a locator for an identifier of the entity 120 from the originating GRIDS-AP 140. The GRIDS-AP 140 forwards the request to the GRIDS-MS 150, which may include a database mapping identifiers to locators. The GRIDS-MS 150 may send the locator for the entity 120 to the originating GRIDS-AP 140. The originating GRIDS-AP 140 sends the received data to the entity 110, which then communicates with the entity 120 via the data plane 170.

For example, data transmitted between the entities 110 and 120 may be routed through one or more routers of the data plane 170, including the routers 180A and 180B. Each router may cache information about the data passing through, aggregate the cached data at the end of a communication flow (e.g., after a lapse of a predetermined period of time wherein no further traffic is received between the two entities), and export the aggregated data to the collector 190.

The collector 190 maintains IPFIX records regarding the data flows and responds to requests for the records. The collector 190 may detect network problems based on differences in reported data from different routers. For example, if the routers 180A and 180B are each in the data path between the entities 110 and 120, each of the routers should report the same information regarding the data flow (e.g., the same total number of data packets sent and the same total number of octets in the data packets). If the router 180A reports a greater amount of data being sent from the entity 110 to the entity 120 than the router 180B reports, the collector 190 may determine that there is a network fault between the two routers.

The detector 195 accesses IPFIX records from the collector 190 adjusts the allocation of resources based on the accessed IPFIX records. For example, in response to detection of a network attack or detection of abuse of a mapping server, the detector 195 may direct the GRIDS-MS 150 to reject mapping requests from an endpoint associated with the attack or abuse. As another example, in response to determination of poor quality of service between two endpoints, the detector 195 may allocate additional network resources to one or both of the affected endpoints. As still another example, in response to determination of excessive use of the network by an endpoint, the detector 195 may cause fewer network resources to be allocated to the offending endpoint.

Figure 2:
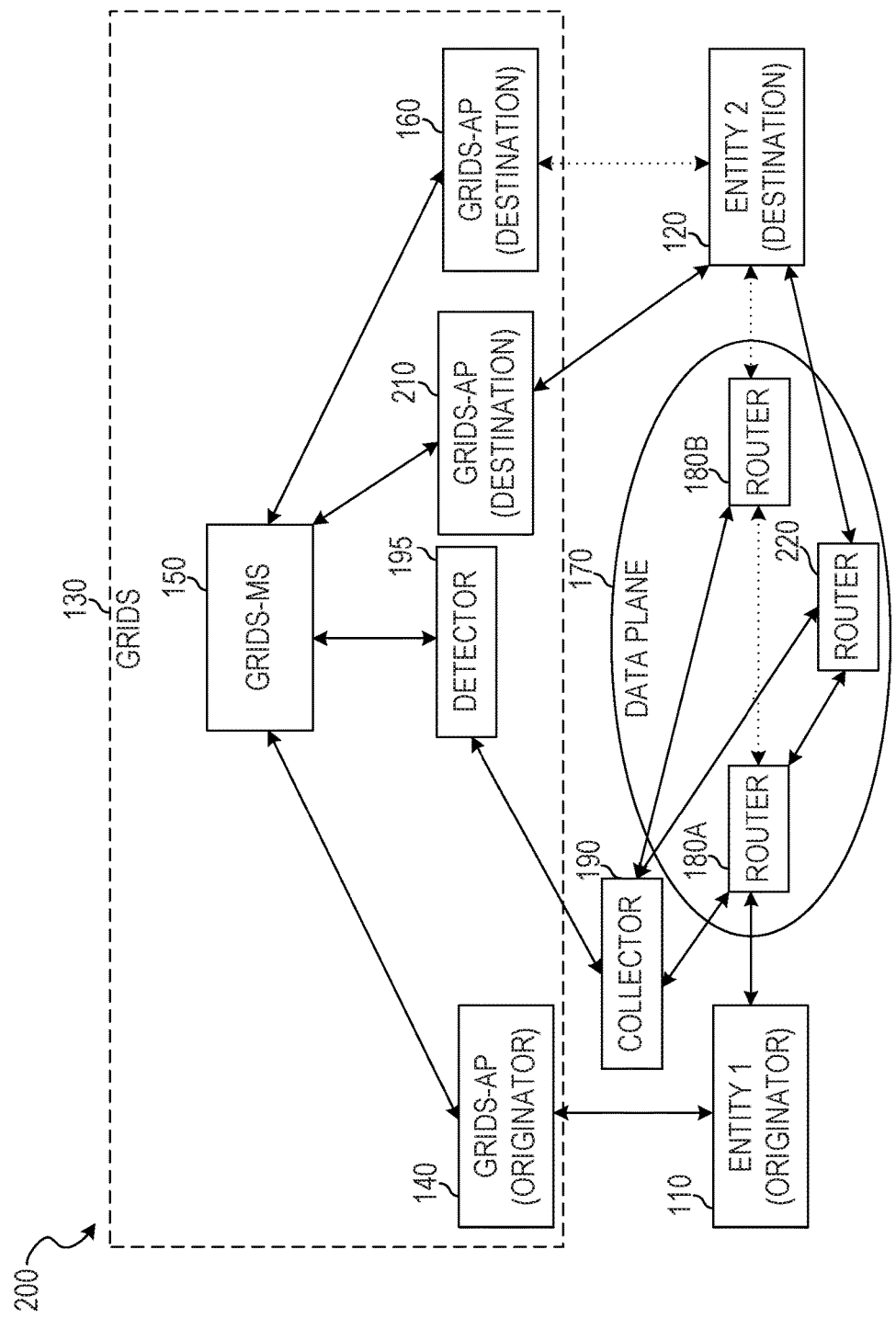
FIG. 2 is an illustration of an example network organization for monitoring, measuring, and analyzing communication flows between identities in an ION using IPFIX extensions, according to some example embodiments.

FIG. 2 is an illustration of an example network organization 200 for monitoring, measuring, and analyzing communication flows between identities in an ION using IPFIX extensions, according to some example embodiments. The example network organization 200 includes the first entity 110, the second entity 120, the data plane 170, the GRIDS network 130, and the collector 190. The GRIDS network 130 comprises the GRIDS-AP 140, the GRIDS-AP 160, a GRIDS-AP 210, and the GRIDS-MS 150. The data plane 170 includes routers 180A, 180B, and 220.

The network organization 200 shows the network organization 100 after the second entity 120 has changed locations and now connects to the data plane 170 via a different router, the router 220. Accordingly, packets addressed to the second entity 120 via the data plane 170 will no longer reach the second entity 120.

The second entity 120 registers its new location by reconnecting to the GRIDS network 130 via the GRIDS-AP 210. The first entity 110 may be informed by the GRIDS-MS 150 of the new locator for the entity 120 and resume communication via the data plane 170. However, any IP flow records that track communication flows between IP addresses will not detect the change of location. Instead, the fact that packets are no longer delivered to the old IP address will be detected as the end of the IP communication flow (e.g., between the IP address of the first entity 110 and the first IP address of the second entity 120). When communication resumes between the two entities using the new IP address, this communication will be detected as the beginning of a new IP communication flow (e.g., between the IP address of the first entity 110 and the second IP address of the second entity 120). However, ID flow records that track communication flows between identifiers will see a continuous communication despite the location change, since changing the location does not impact the identifier of the second entity 120.

The collector 190 may receive a first ID flow cache record from the router 180B. For example, the router 180B may send the ID flow cache record after the elapse of a predetermined period of time from the last data packet routed between the entities 110 and 120 via the router 180B. The collector 190 may receive a second ID flow cache record from the router 220 at a later time, after the elapse of a predetermined period of time from the last data packet routed between the entities 110 and 120 via the router 220. The collector 190 may receive a third ID flow cache record from the router 180A at approximately the same time as the second ID flow cache record is sent from the router 220. The data in each of the three ID flow cache records of this example will be different, as each router received a different portion of the ID flow. The collector 190 may resolve the conflicts between the ID flow cache records when creating an IPFIX record. For example, start and end timestamps of the ID flow cache record of the router 180A may span the total period of time spanned by the ID flow cache records of the routers 180B and 220, implying that the ID flow cache record of the router 180A is complete and the ID flow cache records of the routers 180B and 220 are partial. As another example, the total data transmission indicated in the ID flow cache record of the router 180A may be equal to the sum of the total data transmission indicated in the other two ID flow cache records, also implying that the ID flow cache record of the router 180A is complete and the ID flow cache records of the routers 180B and 220 are partial.

In more complex situations, multiple transitions for each entity may occur and the conflicts between additional ID flow cache records are resolved by the collector 190. For example, ID flow cache records that span a period of time completely within a period of time of another ID flow cache record may be ignored, non-overlapping ID flow cache records may be merged, or other conflict-resolution methods may be used.

Figure 3:
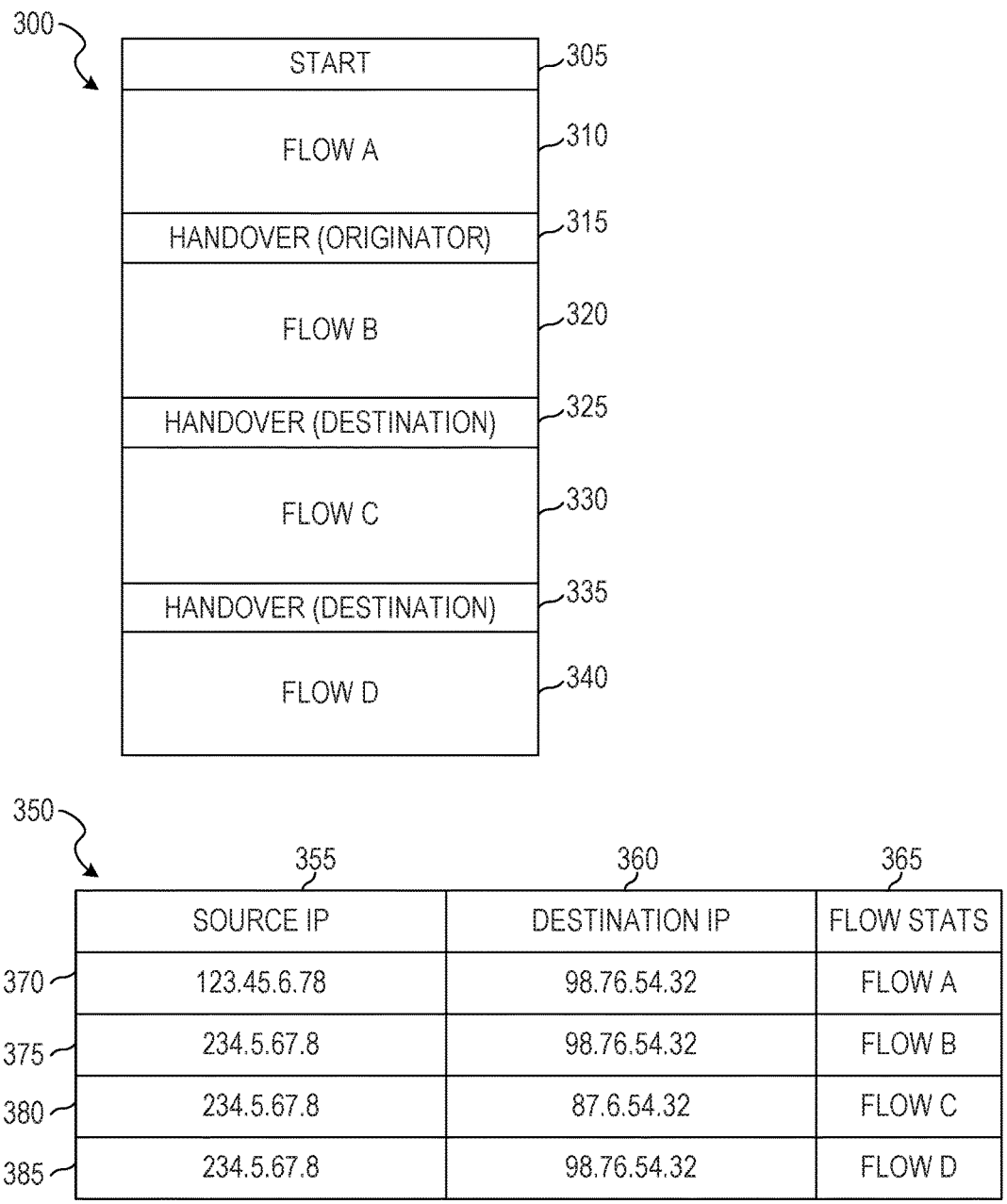
FIG. 3 is an illustration of a sequence of data flows between IP addresses and data structures to store flow statistics of the data flows, according to some example embodiments.

FIG. 3 is an illustration of a sequence of data flows 300 between IP addresses and data structures 350 to store flow statistics of the data flows, according to some example embodiments. The sequence of data flows 300 includes a start event 305, flows 310, 320, 330, and 340, and handovers 315, 325, and 335. The data structures 350 include fields 355, 360, and 365 and records 370, 375, 380, and 385.

The start event 305 indicates the beginning of the flow 310 between entities. The record 370 contains flow statistics in field 365 for the flow 310 and records the source IP address in field 355 and the destination IP address in field 360.

Event 315 indicates a handover of the originator. That is, at event 315, the IP address of the source entity changes. Thus, event 315 marks the end of the flow 310 and the beginning of the flow 320. The record 375 contains flow statistics in field 365 for the flow 320 and records the modified source IP address in field 355 and the destination IP address in field 360.

Event 325 indicates a handover of the destination. That is, at event 325, the IP address of the destination entity changes. Thus, event 325 marks the end of the flow 320 and the beginning of the flow 330. The record 380 contains flow statistics in field 365 for the flow 330 and records the source IP address in field 355 and the modified destination IP address in field 360.

Event 335 indicates another handover of the destination. Thus, event 335 marks the end of the flow 330 and the beginning of the flow 340. The record 385 contains flow statistics in field 365 for the flow 340 and records the source IP address in field 355 and the modified destination IP address in field 360. The flow statistics may include a size for the flow (e.g., a sum of the sizes of all packets in the flow, in octets), a number of data packets in the flow, an average packet size, a packet size variance, a start time for the flow, an end time for the flow, or any suitable combination thereof.

As can be seen by inspection of the IP flow records 370-385, there is no indication that the flows 310, 320, 330, and 340 are actually a single communication flow between two entities. Even if it is noted that the IP addresses in the records 375 and 385 are the same, the flow statistics in each record will show that there is a lapse of time between the two IP flows, and thus a determination would be made that the records 375 and 385 refer to separate communication flows.

Figure 4:
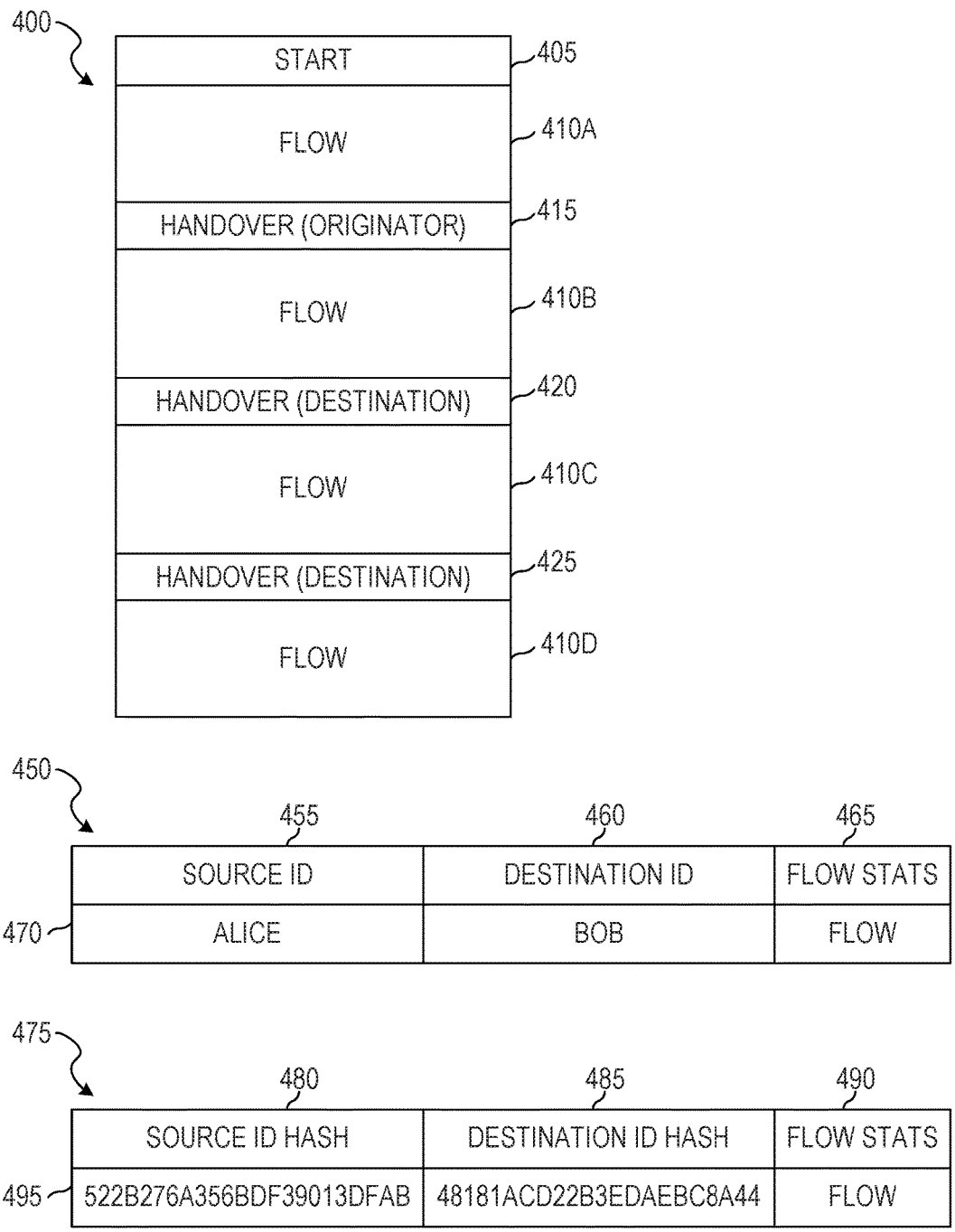
FIG. 4 is an illustration of a data flow between identifiers and data structures to store flow statistics of the data flow, according to some example embodiments.

FIG. 4 is an illustration of a data flow 400 between identifiers and data structures 450 and 475 to store flow statistics of the data flow, according to some example embodiments. The data flow 400 includes a start event 405, flow segments 410A, 410B, 410C, and 410D, referred to in the aggregate as a flow 410, and handovers 415, 420, and 425. The data structure 450 include fields 455, 460, and 465 and record 470. The data structure 475 include fields 480, 485, and 490 and record 495.

The start event 405 indicates the beginning of the flow segment 410A between entities. Event 415 indicates a handover of the originator. That is, at event 415, the IP address of the source entity changes. Nonetheless, since the ID flow records record the flow statistics field 465 using the source ID field 455 and the destination ID field 460, the change in IP address does not disrupt the flow. Additionally or alternatively, the data structure 475 using hashed identifiers may store a hash of the source ID in the source ID hash field 480, a hash of the destination ID in the destination ID hash field 485, and the flow statistics in the flow statistics field 490. Depending on the old and new locations of the entity, the traffic before and after the handover may traverse some of the same routers in the data plane 170. The routers that detect both portions of the traffic may aggregate the data in ID flow records. The routers that detect only one of the two flows may maintain ID flow records that correspond to only the detected portion of the ID flow.

Event 420 indicates a handover of the destination. That is, at event 420, the IP address of the destination entity changes. Event 425 indicates another handover of the destination. With each of these IP address changes, the ID flow tracking in the record 470 (or 495) is unaffected, because the IP address changes do not affect the identifiers of the endpoints involved. Thus, even though the flow segments 410A, 410B, 410C, and 410D involve data packets being transmitted between different pairs of IP addresses, only a single ID flow record 470 (or 495) is created for the flow.

Figure 5:
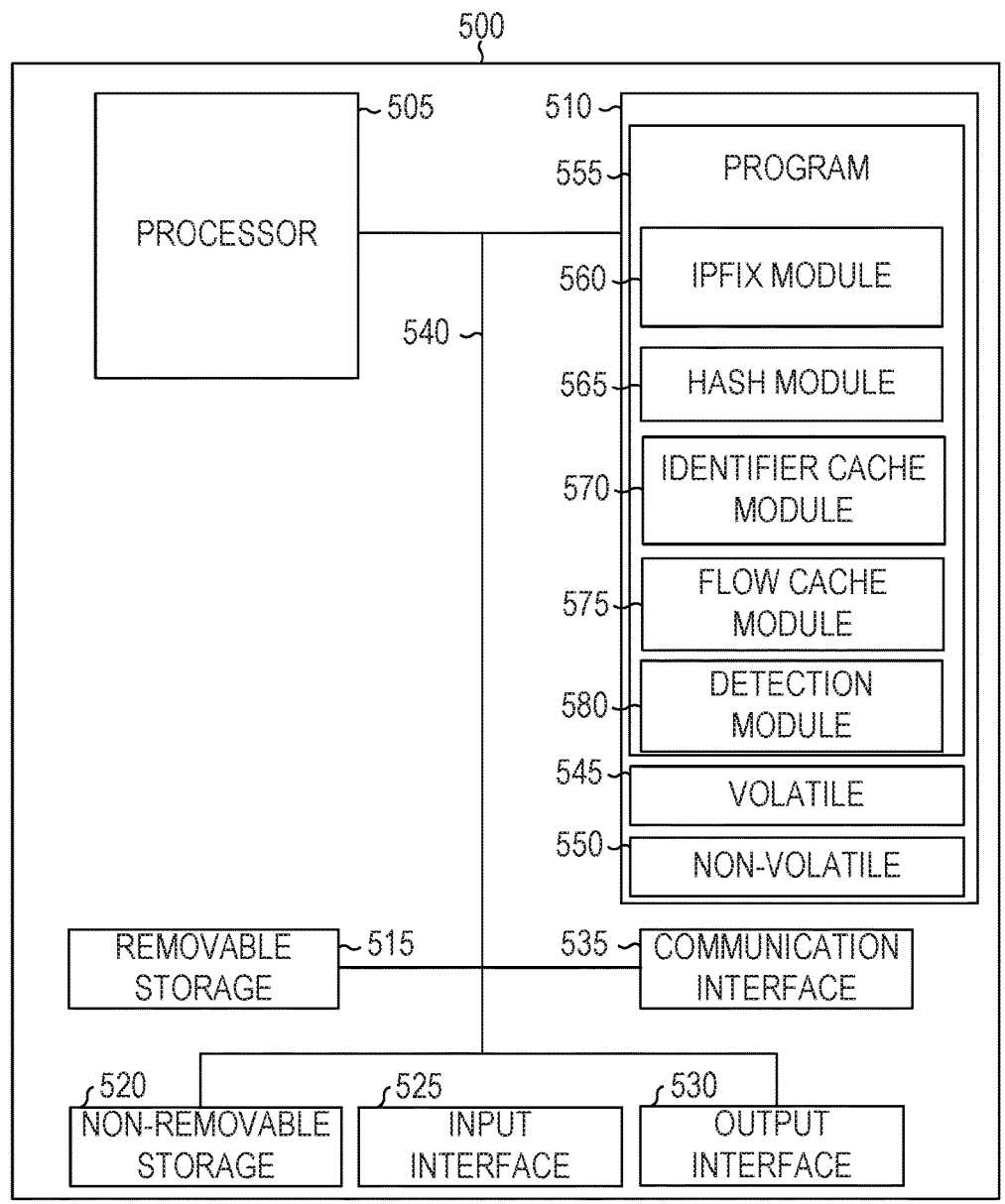
FIG. 5 is a block diagram illustrating circuitry for clients and servers that implement algorithms and perform methods, according to some example embodiments.

FIG. 5 is a block diagram illustrating circuitry for implementing algorithms and performing methods, according to example embodiments. All components need not be used in various embodiments. For example, clients, servers, autonomous systems, and cloud-based network resources may each use a different set of components, or, in the case of servers for example, larger storage devices.

One example computing device in the form of a computer 500 (also referred to as computing device 500 and computer system 500) may include a processor 505, memory storage 510, removable storage 515, and non-removable storage 520, all connected by a bus 540. Although the example computing device is illustrated and described as the computer 500, the computing device may be in different forms in different embodiments. For example, the computing device may instead be a smartphone, a tablet, a smartwatch, or another computing device including elements the same as or similar to those illustrated and described with regard to FIG. 5. Devices such as smartphones, tablets, and smartwatches are generally collectively referred to as "mobile devices" or "user equipment." Further, although the various data storage elements are illustrated as part of the computer 500, the storage may also or alternatively include cloud-based storage accessible via a network, such as the Internet, or server-based storage.

The memory storage 510 may include volatile memory 545 and non-volatile memory 550, and may store a program 555. The computer 500 may include—or have access to a computing environment that includes—a variety of computer-readable media, such as the volatile memory 545, the non-volatile memory 550, the removable storage 515, and the non-removable storage 520. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 500 may include or have access to a computing environment that includes an input interface 525, an output interface 530, and a communication interface 535. The output interface 530 may interface to or include a display device, such as a touchscreen, that also may serve as an input device. The input interface 525 may interface to or include one or more of a touchscreen, a touchpad, a mouse, a keyboard, a camera, one or more device-specific buttons, one or more sensors integrated within or coupled via wired or wireless data connections to the computer 500, and other input devices. The computer 500 may operate in a networked environment using the communication interface 535 to connect to one or more remote computers, such as database servers. The remote computer may include a personal computer (PC), server, router, network PC, peer device or other common network node, or the like. The communication interface 535 may connect to a local-area network (LAN), a wide-area network (WAN), a cellular network, a WiFi network, a Bluetooth network, or other networks.

Computer-readable instructions stored on a computer-readable medium (e.g., the program 555 stored in the memory storage 510) are executable by the processor 505 of the computer 500. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 555 is shown as including an IPFIX module 560, a hash module 565, an identifier cache module 570, a flow cache module 575, and a detection module 580. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The IPFIX module 560 stores and retrieves IP flow data. For example, an IPFIX module 560 of the collector 190 may store flow data between IP addresses in a database table using the format of the data structures 350, may store flow data between IDs in a database table using the format of the data structure 450, or any suitable combination thereof. As another example, the IPFIX module 560 may respond to a request for flow data by accessing stored IP flow or ID flow data, generating one or more IPFIX message data packets that contain the data, and transmitting the data packets over a network to the requester.

The hash module 565 generates, stores, and retrieves fixed-length hashes for identifiers (e.g., variable-length identifiers). For example, the hash module 565 may receive a request for a hash of an identifier, check a cache to see if the hash has already been computed, compute the hash if it is not present in the cache and add the hash/identifier pair to the cache, and return the hash (either newly generated or retrieved from the cache) to the requester. The hash module 565 may be used by the IPFIX module 560 to generate fixed-length hashes for storage in place of identifiers.

The identifier cache module 570 maintains and accesses an identifier cache. For example, the identifier cache module 570 may store a hash for an identifier along with the identifier in a database table and provide the hash in response to a request that includes the identifier, provide the identifier in response to a request that includes the hash, or any suitable combination thereof.

The flow cache module 575 generates, maintains, and exports flow cache records in a flow cache. For example, a flow cache module 575 of the router 180A may generate a new flow cache record when it sees a first packet from a first entity to a second entity. The flow cache module 575 may update the flow cache record when additional packets transmitted between the two entities via the router 180A. After a lapse of a predetermined period of time (e.g., 30 seconds) without seeing additional packets transmitted between the two entities, the flow cache entry may be exported by the flow cache module 575 to the collector 190 and the flow cache record deleted from the flow cache. Thus, when another packet is seen being transmitted from the first entity to the second entity, a new flow cache record will be created by the flow cache module 575. In some example embodiments, thousands of flow cache records are generated or maintained by the flow cache module 575 every second.

The detection module 580 accesses a set of IPFIX records and detects ID flows caused by malware, abuse of a mapping server by requesting locators without immediately using them, or updates accounting records based on ID flows. For example, a set of ID flows that are all the same size and not associated with any known application may be caused by malware. As another example, requests for a large number of locators that are not followed up by ID flows with the corresponding endpoints may indicate a malicious locator harvesting operation. As a third example, accounting records (e.g., billing records based on network resource consumption) may be updated based on ID flows.

Figure 6:
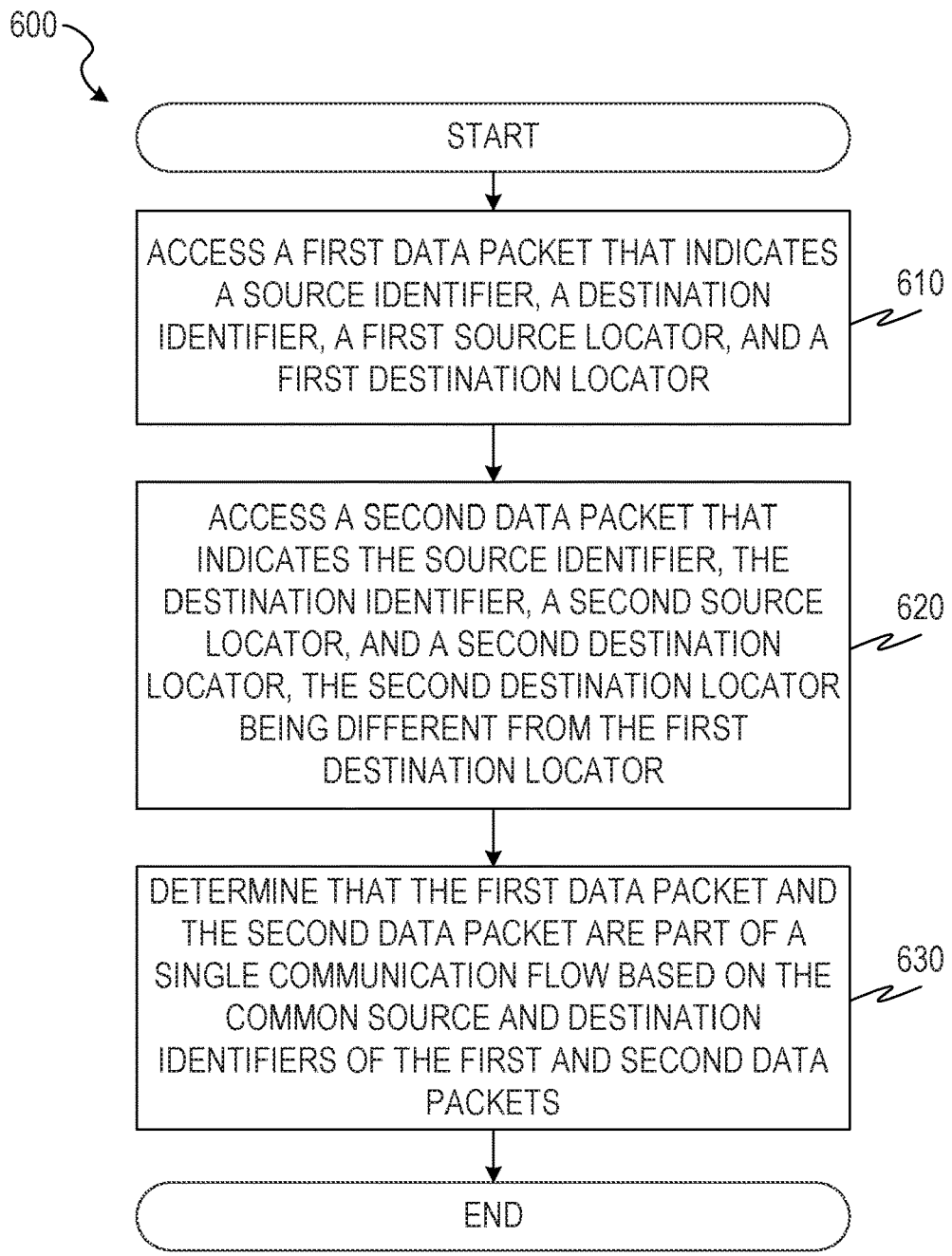
FIG. 6 is a flowchart illustration of a method of monitoring, measuring, and analyzing communication flows between identities in an ION using IPFIX extensions, according to some example embodiments.

FIG. 6 is a flowchart illustration of a method 600 of monitoring, measuring, and analyzing communication flows between identities in an ION using IPFIX extensions, according to some example embodiments. The method 600 includes operations 610, 620, and 630. By way of example and not limitation, the method 600 is described as being performed by elements of the network topology 100, described above with respect to FIG. 1, and the computer 500, described above with respect to FIG. 5.

In operation 610, the IPFIX module 560 accesses a first data packet that indicates a source identifier, a destination identifier, a first source locator, and a first destination locator. The IPFIX module 560 may be part of a GRIDS-AP, part of a GRIDS-MS, or an independent server. The first data packet may be routed through the machine that includes the IPFIX module 560 or otherwise accessed by the IPFIX module 560. The first data packet may be part of a data flow between the source and the destination. The first data packet or data derived from the first data packet may be stored in a database for later analysis. For example, a record may be created that stores the source identifier, the destination identifier, the first source locator, the first destination locator, and a payload of the first data packet.

In operation 620, the IPFIX module 560 accesses a second data packet that indicates the source identifier, the destination identifier, a second source locator, and a second destination locator, the second destination locator being different from the first destination locator. The second data packet may be part of the data flow between the source and the destination after a transition of the destination from a first location to a second location. The second data packet or data derived from the second data packet may be stored in a database for later analysis (e.g., the same database as the data for the first data packet was stored in). For example, a record may be created that stores the source identifier, the destination identifier, the first source locator, the first destination locator, and a payload of the second data packet.

In operation 630, the IPFIX module 560 determines that the first data packet and the second data packet are part of a single communication flow based on the common source and destination identifiers of the first and second data packets. As a result, the IPFIX module 560 may aggregate information regarding the two data packets in a single flow record. Additional packets received that indicate the same source/destination identifier pair may also be aggregated with the first data packet and the second data packet. In some example embodiments, the determination that the two data packets are part of the single communication flow is based on analysis of the records created in a database for each data packet. In other example embodiments, the determination that the two data packets are part of the single communication flow is based on a comparison of the source and destination identifiers in the second data packet with the identifiers in the flow record.

Figure 7:
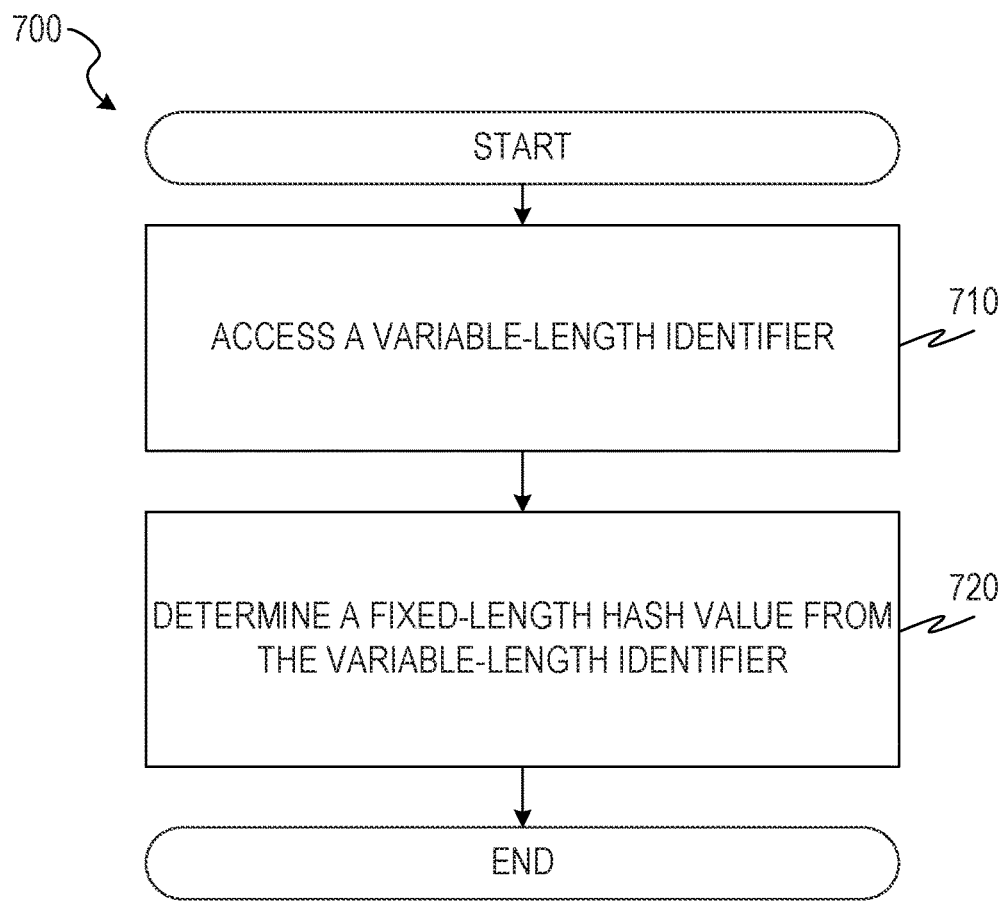
FIG. 7 is a flowchart illustration of a method of generating a fixed-length hash for a variable-length identifier in an ION, according to some example embodiments.

FIG. 7 is a flowchart illustration of a method 700 of generating a fixed-length hash for a variable-length identifier in an ION, according to some example embodiments. The method 700 includes operations 710 and 720. By way of example and not limitation, the method 700 is described as being performed by elements of the network topology 100, described above with respect to FIG. 1, and the computer 500, described above with respect to FIG. 5.

In operation 710, the hash module 565 accesses a variable-length identifier. For example, the IPFIX module 560 may have extracted the variable-length identifier from a data packet and provided it to the hash module 565.

In operation 720, the hash module 565 determines a fixed-length hash value from the variable-length identifier. For example, a message digest version 5 (MD5), or secure hash algorithm 1 (SHA-1) hash may be determined. The hash module 565 may provide the fixed-length hash value to a requester for further use. For example, the IPFIX module 560 may request hashes of a pair of variable-length identifier and use the hashes in IPFIX records in place of the identifiers.

Figure 8:
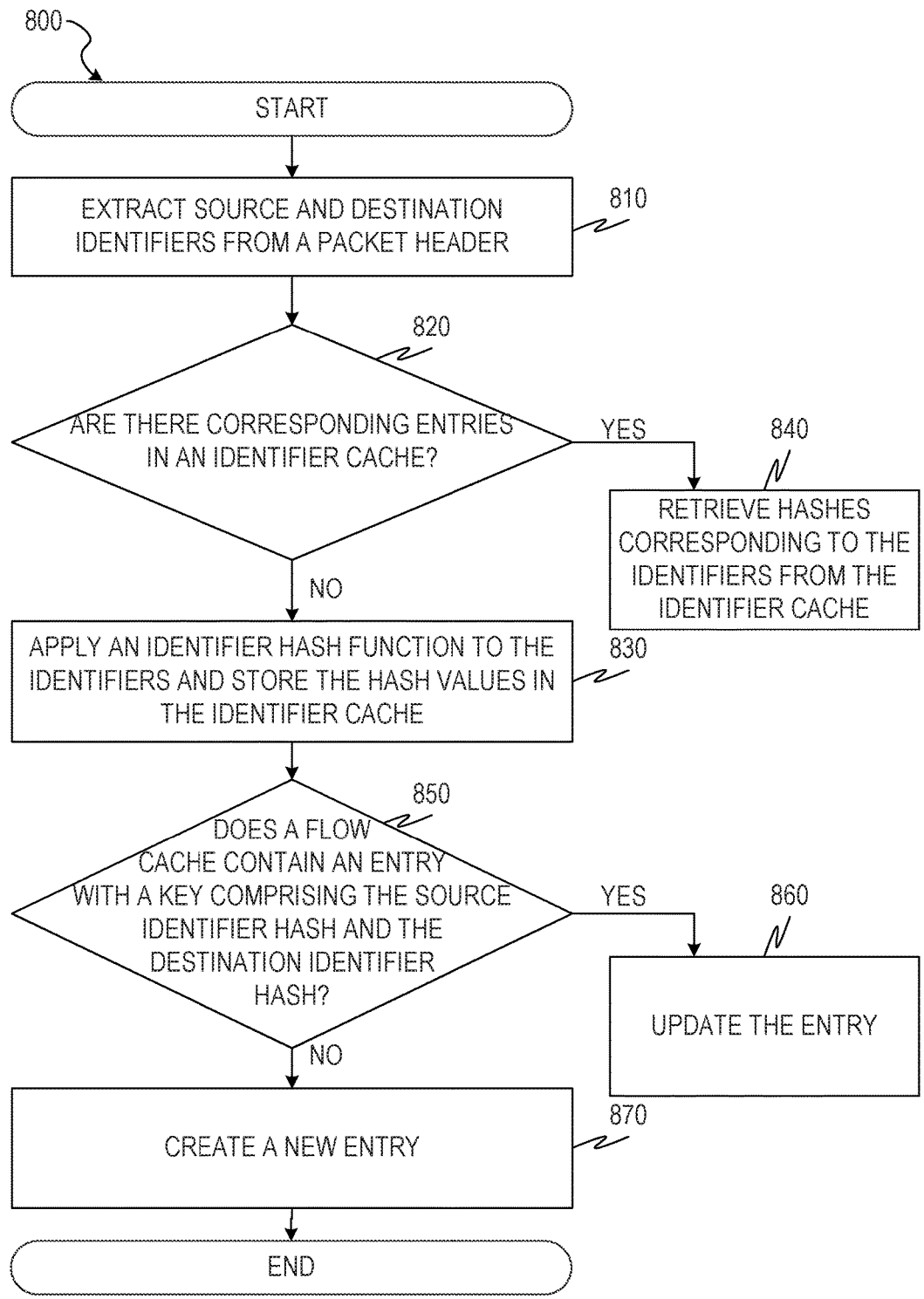
FIG. 8 is a flowchart illustration of a method of storing communication flows between identities in an ION, according to some example embodiments.

FIG. 8 is a flowchart illustration of a method 800 of storing communication flows between identities in an ION, according to some example embodiments. The method 800 includes operations 810, 820, 830, 840, 850, 860, and 870. By way of example and not limitation, the method 800 is described as being performed by elements of the network topology 100, described above with respect to FIG. 1, and the computer 500, described above with respect to FIG. 5.

In operation 810, the flow cache module 575 extracts source and destination identifiers from a packet header. For example, a packet sent from the first entity 110 to the second entity 120 via the router 180A may include a header that includes source and destination identifier fields with an identifier of the first entity 110 stored in the source identifier field and an identifier of the second entity 120 stored in the destination identifier field.

In operation 820, the identifier cache module 570 determines if there are entries in an identifier cache for the source identifier or the destination identifier. For each of the two identifiers, if the identifier is in the cache, the identifier cache module 570 retrieves a cached hash of the identifier (operation 840). If the identifier is not in the cache, the hash module 565, in operation 830, applies an identifier hash function to the identifier and stores the hash value, via the identifier cache module 570, in the identifier cache.

In operation 850, the flow cache module 575 determines if there is an entry in a flow cache that comprises the source identifier hash and the destination identifier hash. If the entry exists, the flow cache module 575 updates, in operation 860, the entry with data related to the packet accessed in operation 810. If the entry does not exist, the flow cache module 575 creates, in operation 870, a new entry in the flow cache that includes the source identifier hash and the destination identifier hash, along with flow statistics related to the packet accessed in operation 810.

Figure 9:
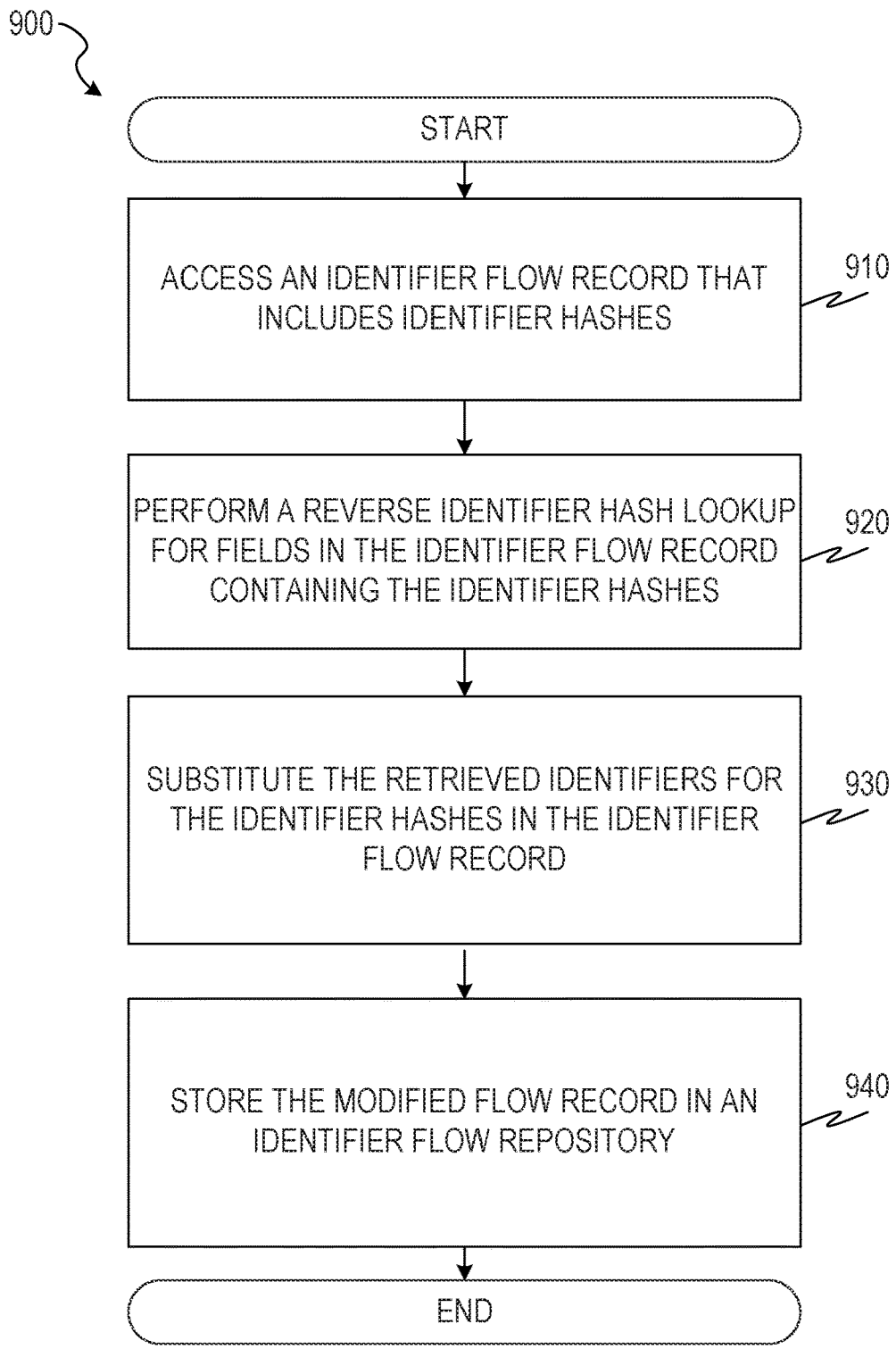
FIG. 9 is a flowchart illustration of a method of storing communication flows between identities in an ION, according to some example embodiments.

FIG. 9 is a flowchart illustration of a method 900 of storing communication flows between identities in an ION, according to some example embodiments. The method 900 includes operations 910, 920, 930, and 940. By way of example and not limitation, the method 900 is described as being performed by elements of the network topology 100, described above with respect to FIG. 1, and the computer 500, described above with respect to FIG. 5.

In operation 910, the IPFIX module 560 accesses an identifier flow record that includes identifier hashes. For example, the collector 190 may receive a request to provide a flow record that includes the source and destination identifiers (e.g., using the format of the data structure 450) but only have access to flow data in a database table that uses hashes instead of identifiers (e.g., using the format of the data structure 475).

In operation 920, the IPFIX module 560, via the identifier cache module 570, performs a reverse identifier hash lookup for fields in the identifier flow record that contain identifier hashes. For example, records created during operation 830 may be accessed that map identifiers to their hashes. By performing the reverse identifier hash lookup, the identifier is retrieved based on the hash.

In operation 930, the IPFIX module 560 substitutes the retrieved identifiers for the identifier hashes in the identifier flow control record. Thus, a flow control record that contains the identifiers of the source and destination endpoints is created.

In operation 940, the IPFIX module 560 stores the modified flow record in an identifier flow repository. Through repeated application of the method 900 to all identifier flow records in a database table with records of the format of the data structure 475 (using hashes), the database table can be converted to a database table with records of the format of the data structure 450 (using identifiers). When multiple flow records are accessed, they may be accessed in bulk or serially. For example, multiple identifier flow records may be accessed in operation 910, multiple reverse identifier hashes may be performed in operation 920, multiple substitutions may be performed in operation 930, and multiple records may be stored in operation 940 or the series of operations 910, 920, 930, and 940 may be repeated for each identifier flow record.

As described above, the method 900 is performed by an IPFIX server (e.g., the collector 190). However, the method 900 may also be performed by an IPFIX client interacting with a hash server. For example, IPFIX data using hashed identifiers may be made publically or widely available, since the entities involved in the communication cannot be directly identified from the hashes, but a hash server may provide identifier lookup services to a limited set of clients trusted to view the actual entity identities. A trusted client may receive a flow record from an IPFIX server in operation 910, request the reverse identifier hash lookup from a hash server in operation 920, substitute the identifier for the hash in operation 930, and store the modified flow record in operation 940.

Figure 10:
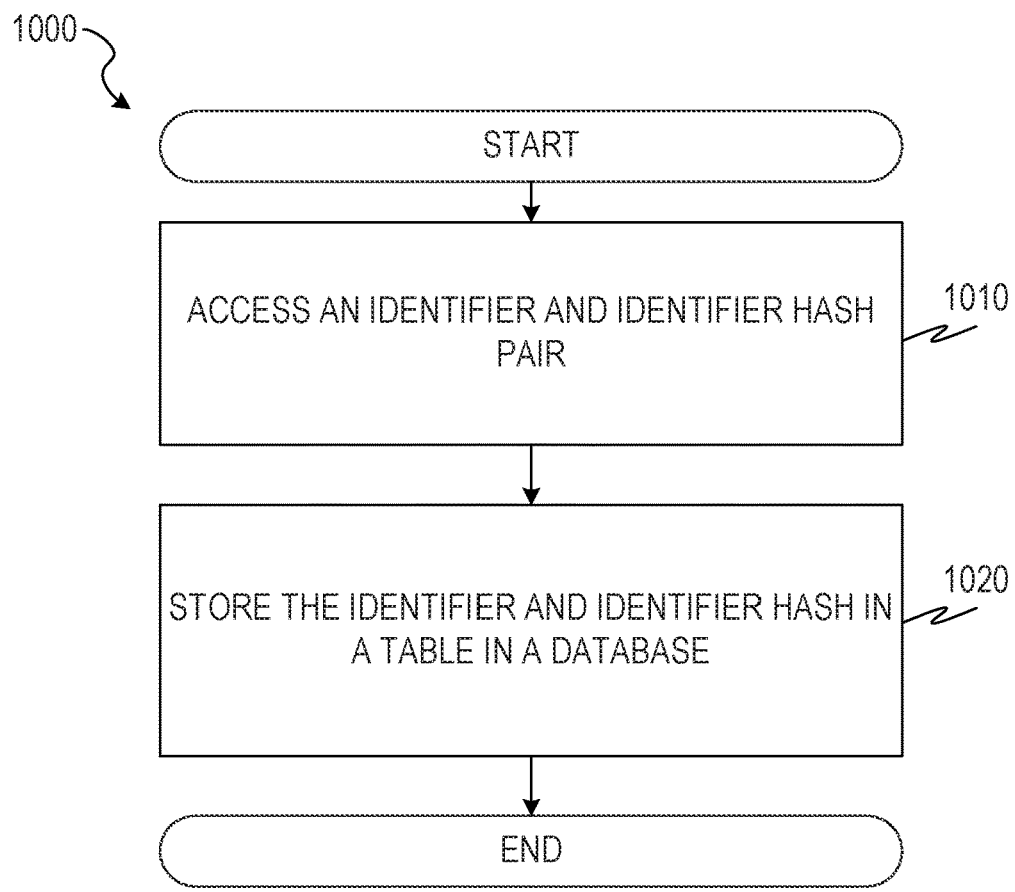
FIG. 10 is a flowchart illustration of a method of storing a mapping between an identifier in an ION and a hash of the identifier, according to some example embodiments.

FIG. 10 is a flowchart illustration of a method 1000 of storing a mapping between an identifier in an ION and a hash of the identifier, according to some example embodiments. The method 1000 includes operations 1010 and 1020. By way of example and not limitation, the method 1000 is described as being performed by elements of the network topology 100, described above with respect to FIG. 1, and the computer 500, described above with respect to FIG. 5.

In operation 1010, the identifier cache module 570 accesses an identifier and a hash of the identifier. For example, the hash module 565 may have determined a fixed-length hash of a variable-length identifier from a data packet and provided both the hash and the identifier to the identifier cache module 570 for caching.

In operation 1020, the identifier cache module 570 stores the identifier and the identifier hash in a table in a database. In some example embodiments, each record includes a timestamp as well. The database table added to in operation 1020 may be used in operation 840, operation 920, or both.

Figure 11:
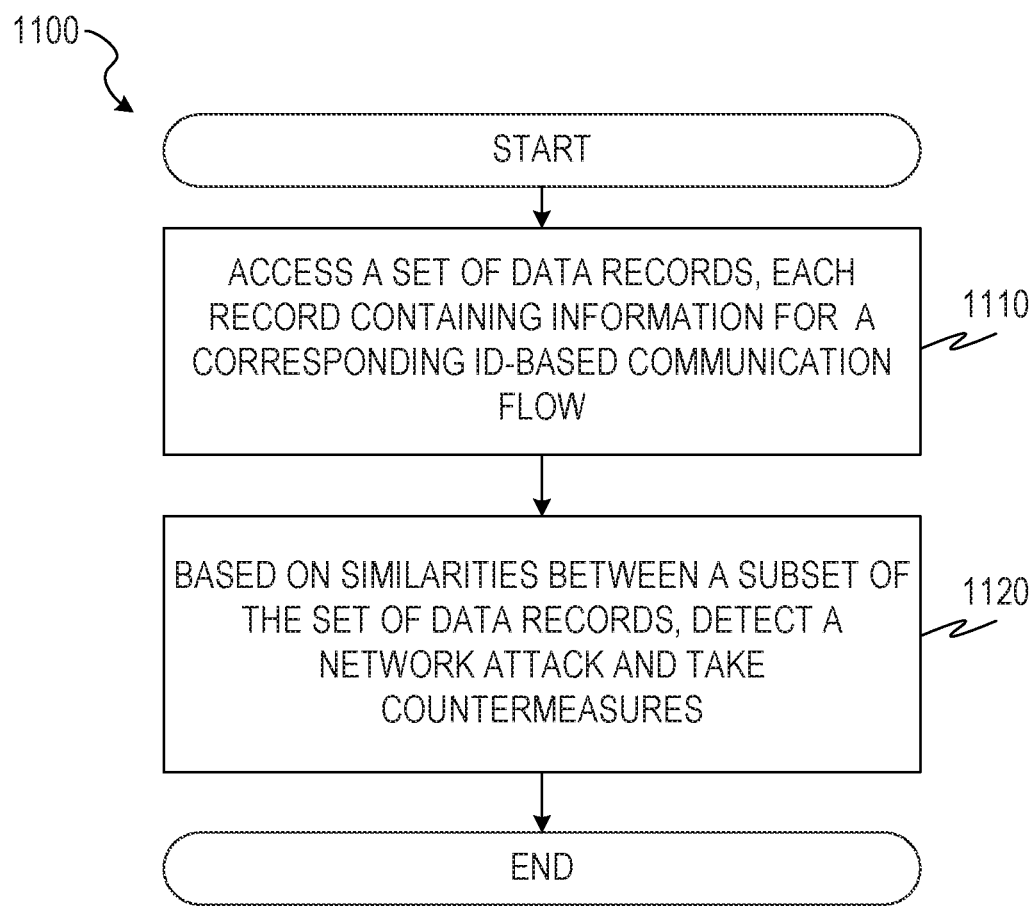
FIG. 11 is a flowchart illustration of a method of using identifier (ID) flow records to detect a network attack, according to some example embodiments.

FIG. 11 is a flowchart illustration of a method 1100 of using ID flow records to detect a network attack, according to some example embodiments. The method 1100 includes operations 1110 and 1120. By way of example and not limitation, the method 1100 is described as being performed by elements of the network topology 100, described above with respect to FIG. 1, and the computer 500, described above with respect to FIG. 5.

In operation 1110, the detection module 580 of the detector 195 accesses a set of data records, each record containing information for a corresponding ID-based data flow. For example, a set of records of the format of the data structure 450 may be accessed using IPFIX requests sent to the collector 190.

In operation 1120, based on similarities between a subset of the set of data records, the detection module 580 of the detector 195 detects a network attack and takes countermeasures. For example, each record of the subset of the set of data records may indicate an identical flow length. Based on the flow length matching a known flow length of malware, not matching a known flow length of a legitimate application, or both, the detection module 580 may determine that the subset of the data records are caused by malware. Based on the detection of the malware, the detection module 580 may take countermeasures. For example, one or more ports used in the data flows of the malware may be blocked, future locator requests from endpoints associated with the malware may be denied, a report may be made to an administrator, or any suitable combination thereof.

Figure 12:
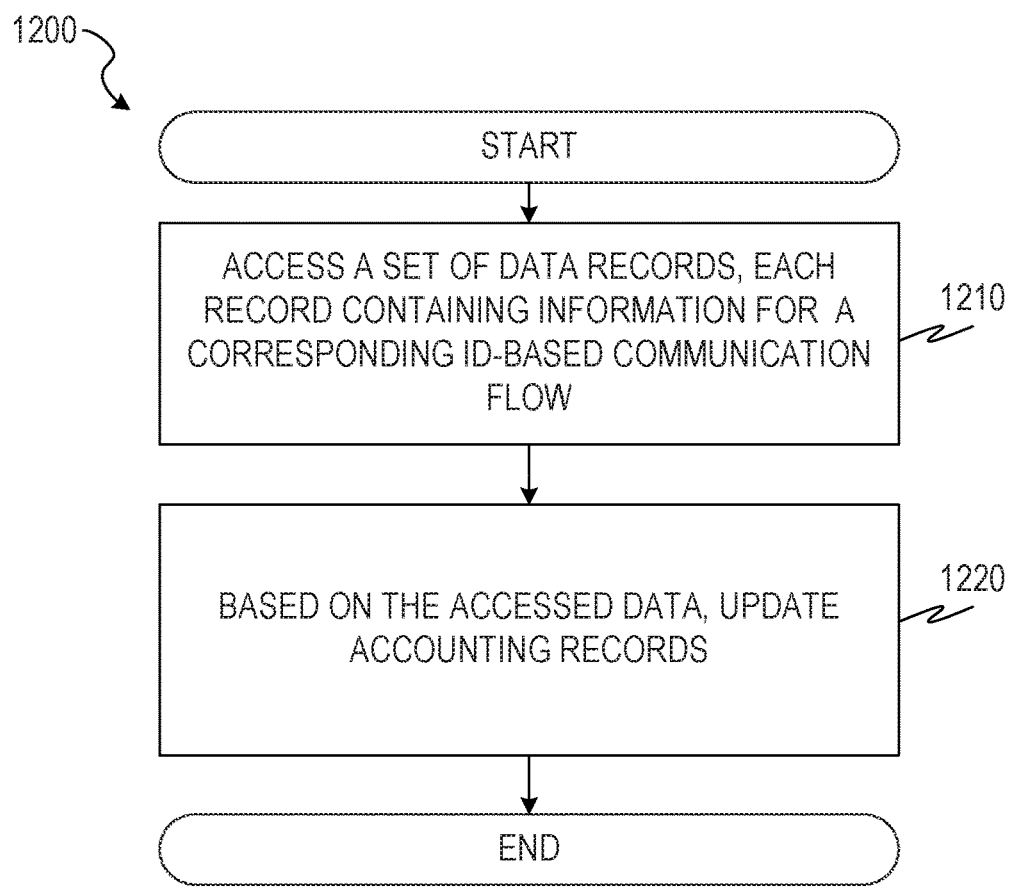
FIG. 12 is a flowchart illustration of a method of using ID flow records to update accounting records, according to some example embodiments.

FIG. 12 is a flowchart illustration of a method 1200 of using ID flow records to update accounting records, according to some example embodiments. The method 1200 includes operations 1210 and 1220. By way of example and not limitation, the method 1200 is described as being performed by elements of the network topology 100, described above with respect to FIG. 1, and the computer 500, described above with respect to FIG. 5.

In operation 1210, the detection module 580 of the detector 195 accesses a set of data records, each record containing information for a corresponding ID-based data flow. For example, a set of records of the format of the data structure 450 may be accessed.

In operation 1220, based on the accessed data, the detection module 580 of the detector 195 updates accounting records. For example, a first database table may contain a mapping between endpoint identifiers and clients. A second database table may contain billing records for the clients, wherein each client is charged a fixed fee for each megabyte of network traffic to or from its associated endpoints. Thus, the detection module 580 may access IPFIX records that indicate the network usage by each endpoint, determine the corresponding client from the first database table, and update the accounting records of the second database table accordingly.

Figure 13:
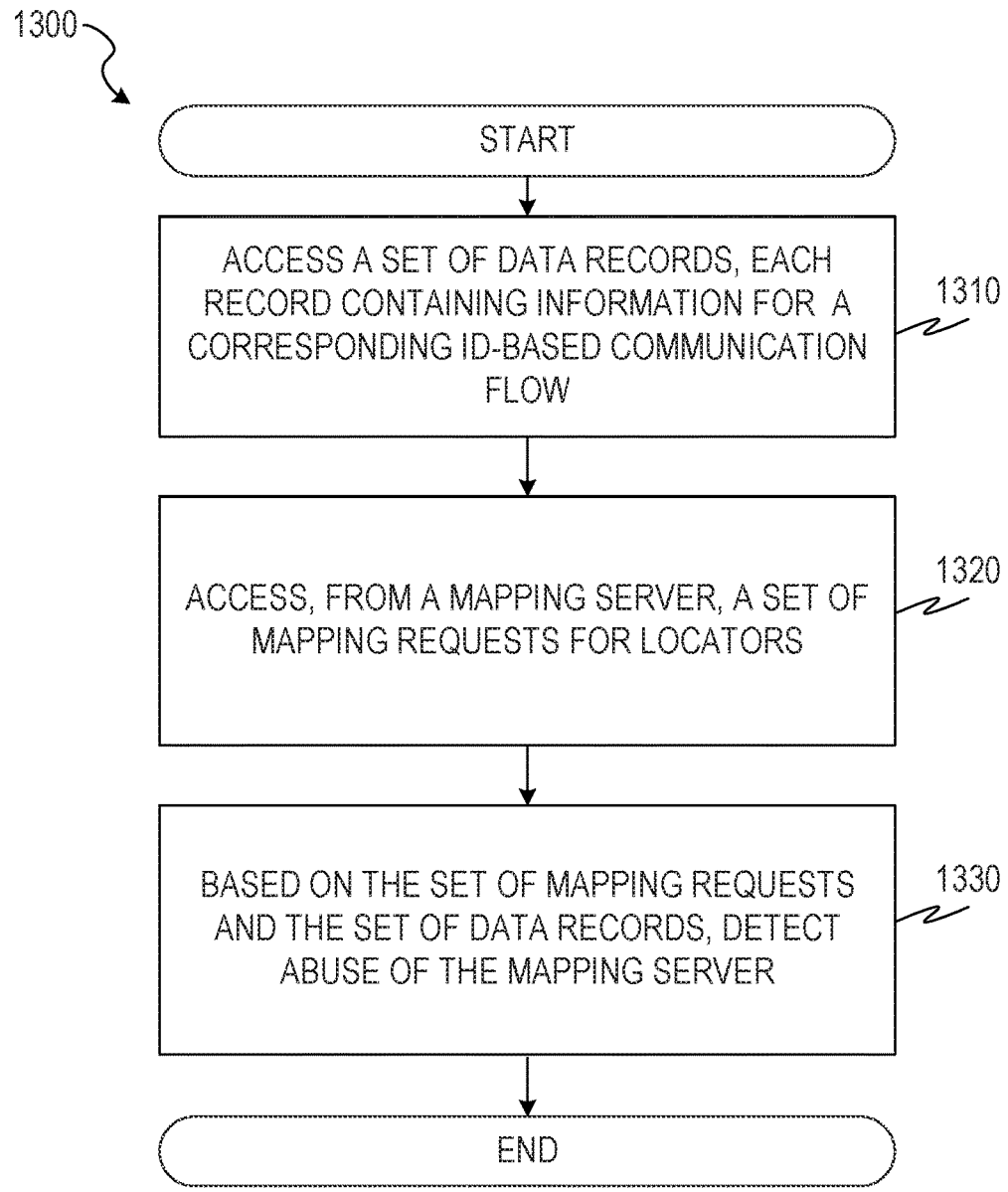
FIG. 13 is a flowchart illustration of a method of using ID flow records to detect abuse of a mapping server, according to some example embodiments.

FIG. 13 is a flowchart illustration of a method 1300 of using ID flow records to detect abuse of a mapping server, according to some example embodiments. The method 1300 includes operations 1310, 1320, and 1330. By way of example and not limitation, the method 1300 is described as being performed by elements of the network topology 100, described above with respect to FIG. 1, and the computer 500, described above with respect to FIG. 5.

In operation 1310, the detection module 580 of the detector 195 accesses a set of data records, each record containing information for a corresponding ID-based data flow. For example, a set of records of the format of the data structure 450 may be accessed.

In operation 1320, the detection module 580 of the detector 195 accesses, from a mapping server (e.g., the GRIDS-MS 150), a set of mapping requests for locators. For example, the GRIDS-MS 150 may maintain a database table that indicates a time of a mapping request, an identifier of the requesting entity, and an identifier of the entity for which a locator was requested.

In operation 1330, based on the set of mapping requests and the set of data records, the detection module 580 of the detector 195 detects abuse of the mapping server. For example, records for the previous hour may be accessed and a determination made that a requesting entity requested locators for a dozen entities that were never used in a communication flow by the requesting entity. Accordingly, the detection module 580 determines that the requesting entity was using the mapping server to gather information rather than to facilitate communication. In some example embodiments, countermeasures to the abuse are taken. For example, mapping requests from the requesting entity may be denied for a period of time, an administrator may be alerted, locators for the affected endpoints may be changed, or any suitable combination thereof.

Figure 14:
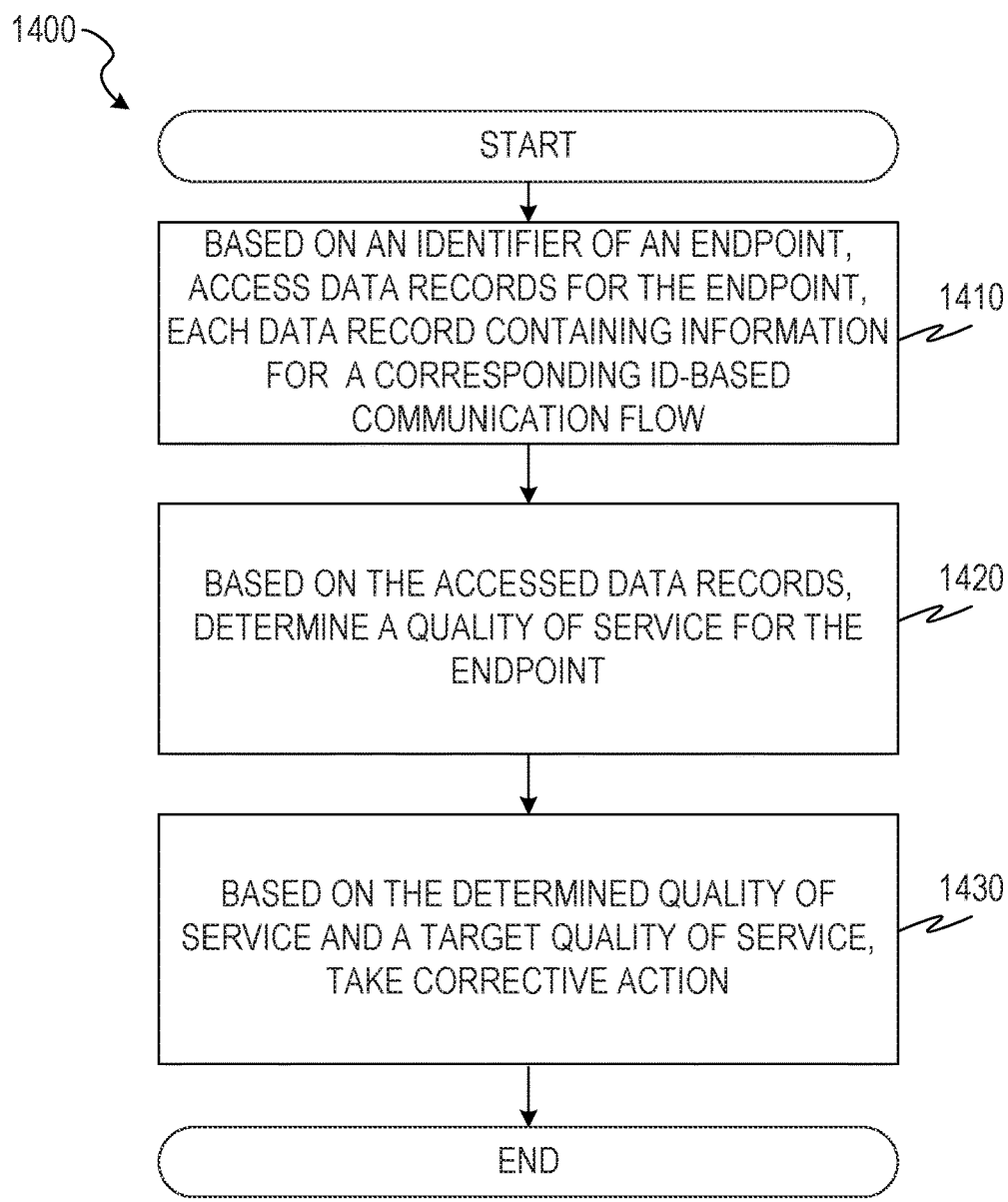
FIG. 14 is a flowchart illustration of a method of using ID flow records to detect quality of service problems, according to some example embodiments.

FIG. 14 is a flowchart illustration of a method 1400 of using ID flow records to detect quality of service problems, according to some example embodiments. The method 1400 includes operations 1410, 1420, and 1430. By way of example and not limitation, the method 1400 is described as being performed by elements of the network topology 100, described above with respect to FIG. 1, and the computer 500, described above with respect to FIG. 5.

In operation 1410, based on an identifier of an endpoint, the detection module 580 of the detector 195 accesses data records for the endpoint, each record containing information for a corresponding ID-based data flow. For example, a set of records of the format of the data structure 450 may be accessed, each record having at least one of the source ID field 455 and the destination ID field 460 matching the identifier of the endpoint.

In operation 1420, based on the accessed data records, the detection module 580 of the detector 195 determines a quality of service for the endpoint. For example, the length of each flow may be compared to a predetermined threshold to determine if the flow was incomplete (e.g., flows under 100 kB may be considered incomplete). The number of flows, the duration of each flow, or any suitable combination thereof may be considered as an indicator of quality of service.

In other example embodiments, more complex metrics for quality of service are used. For example, the flow statistics field 365 may include an identifier of the service associated with each ID flow. The service may be identified based on the port used for communication or another factor. The predetermined threshold used to determine if a particular flow is incomplete may be based on the service associated with the flow. For example, a threshold for a ping service may be lower than a threshold for a video chat service.

As another example of a quality of service metric, a number of problem packets (e.g., packets with errors, dropped packets, or both) may be determined from the ID flow records. The number of problem packets within a period of time (e.g., 5 minutes) may be used as a quality of service measure.

In operation 1430, based on the determined quality of service and a target quality of service, the detection module 580 of the detector 195 takes corrective action. For example, the target quality of service may be 10 incomplete flows per hour, the accessed data records in operation 1410 may be records for the flows of the endpoint within the past hour, and the determined quality of service may be 12 incomplete flows in the past hour. By comparison of the target quality of service and the determined quality of service, poor quality of service may be detected and corrective action taken. Example corrective action includes adjusting routing decisions for the endpoint, reserving additional bandwidth for the endpoint, or any suitable combination thereof.

Figure 15:
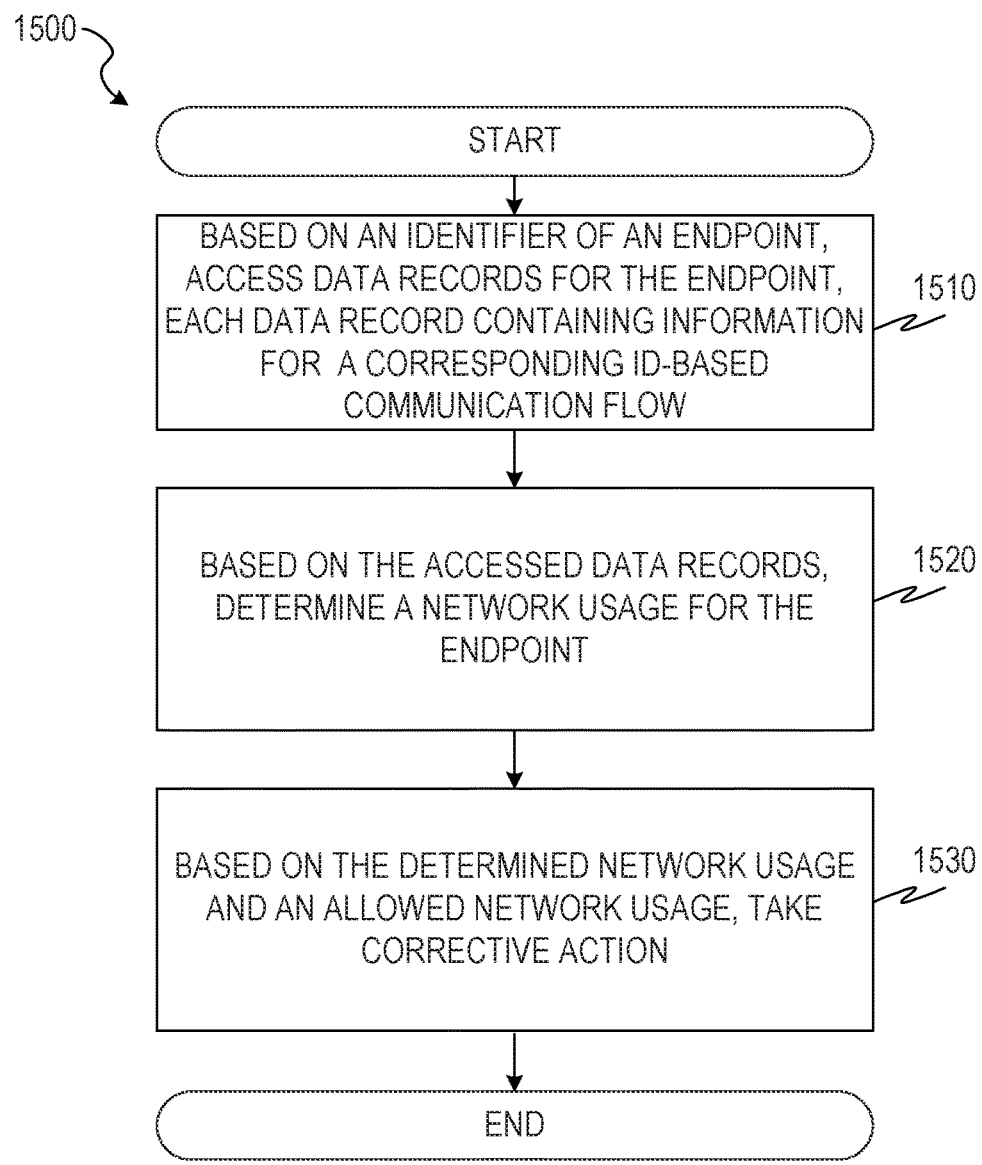
FIG. 15 is a flowchart illustration of a method of using ID flow records to detect excess network usage, according to some example embodiments.

FIG. 15 is a flowchart illustration of a method 1500 of using ID flow records to detect excess network usage, according to some example embodiments. The method 1500 includes operations 1510, 1520, and 1530. By way of example and not limitation, the method 1500 is described as being performed by elements of the network topology 100, described above with respect to FIG. 1, and the computer 500, described above with respect to FIG. 5.

In operation 1510, based on an identifier of an endpoint, the detection module 580 of the detector 195 accesses data records for the endpoint, each record containing information for a corresponding ID-based data flow. For example, a set of records of the format of the data structure 450 may be accessed, each record having at least one of the source ID field 455 and the destination ID field 460 matching the identifier of the endpoint.

In operation 1520, based on the accessed data records, the detection module 580 of the detector 195 determines a network usage for the endpoint. For example, the length of each flow may be summed to determine a total network usage for the endpoint. In this example, the network usage measures total bandwidth used. As another example, the number of flows including the endpoint may be used as the network usage of the endpoint. In this example, the network usage measures total connection attempts. As yet another example, network usage is a weighted average of the bandwidth used and the connection attempt count.

In operation 1530, based on the determined network usage and an allowed network usage, the detection module 580 of the detector 195 takes corrective action. For example, the allowed network usage may be one gigabyte per hour, the data records accessed in operation 1510 may be records for the flows of the endpoint within the past hour, and the determined network usage may be two gigabytes per hour. By comparison of the allowed network usage and the determined quality of service, excess usage may be detected and corrective action taken. Example corrective action includes reducing network bandwidth for the endpoint, increasing billing for excess usage, notifying an administrator, or any suitable combination thereof.

Figure 16:
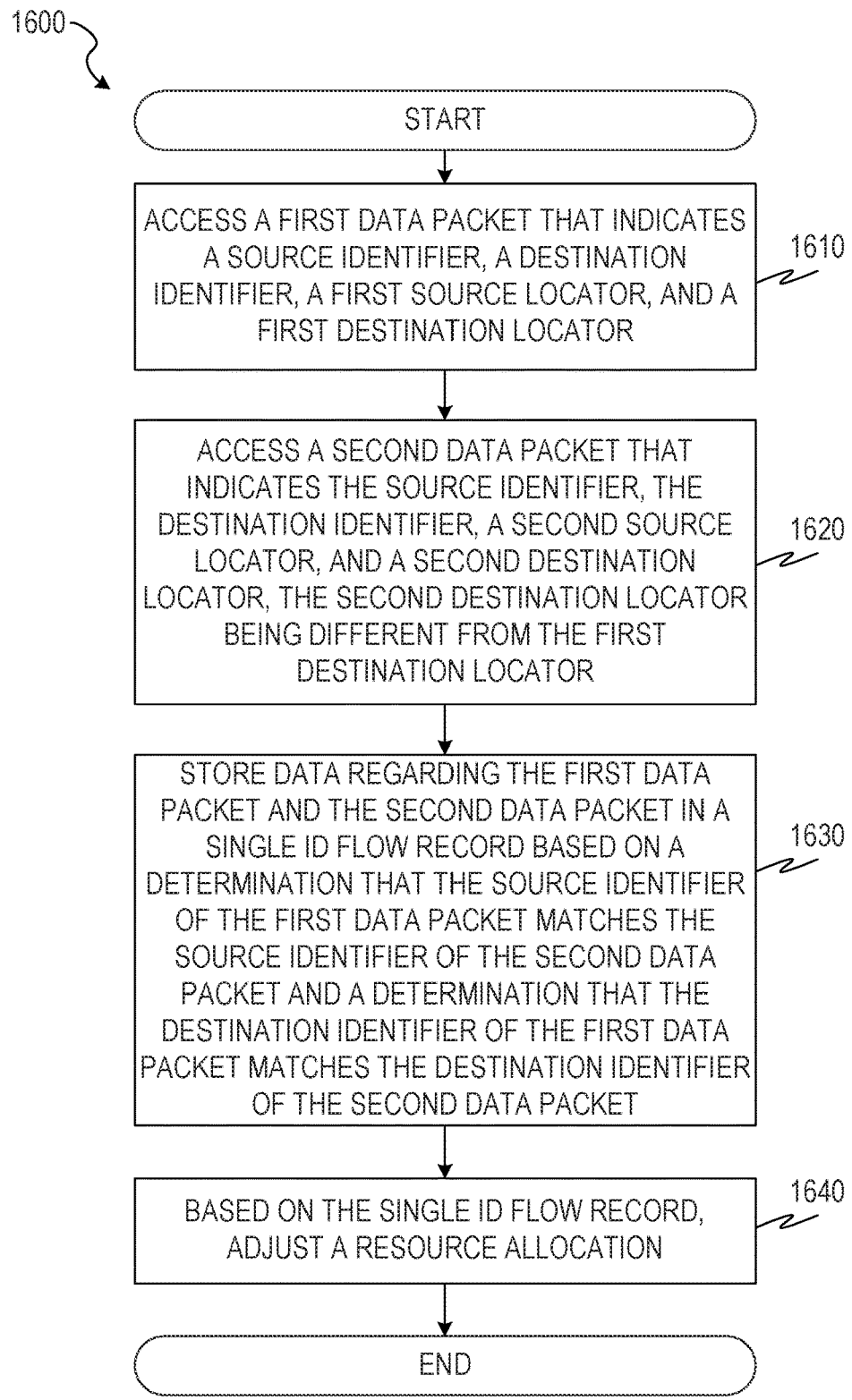
FIG. 16 is a flowchart illustration of a method of generating an ID flow record and using the ID flow record to adjust a resource allocation, according to some example embodiments.

FIG. 16 is a flowchart illustration of a method 1600 of generating an ID flow record and using the ID flow record to adjust a resource allocation, according to some example embodiments. The method 1600 includes operations 1610, 1620, 1630, and 1640. By way of example and not limitation, the method 1600 is described as being performed by elements of the network topology 100, described above with respect to FIG. 1, and the computer 500, described above with respect to FIG. 5.

In operation 1610, the IPFIX module 560 accesses a first data packet that indicates a source identifier, a destination identifier, a first source locator, and a first destination locator. The IPFIX module 560 may be part of a GRIDS-AP, part of a GRIDS-MS, or an independent server. The first data packet may be routed through the machine that includes the IPFIX module 560 or otherwise accessed by the IPFIX module 560. The first data packet may be part of a data flow between the source and the destination. The first data packet or data derived from the first data packet may be stored in a database for later analysis. For example, a record may be created that stores the source identifier, the destination identifier, the first source locator, the first destination locator, and a payload of the first data packet.

In operation 1620, the IPFIX module 560 accesses a second data packet that indicates the source identifier, the destination identifier, a second source locator, and a second destination locator, the second destination locator being different from the first destination locator. The second data packet may be part of the data flow between the source and the destination after a transition of the destination from a first location to a second location. The second data packet or data derived from the second data packet may be stored in a database for later analysis (e.g., the same database as the data for the first data packet was stored in). For example, a record may be created that stores the source identifier, the destination identifier, the first source locator, the first destination locator, and a payload of the second data packet.

In operation 1630, the IPFIX module 560 stores data regarding the first data packet and the second data packet in a single ID flow record based on a determination that the source identifier of the first data packet matches the source identifier of the second data packet and a determination that the destination identifier of the first data packet matches the destination identifier of the second data packet. Additional packets received that indicate the same source/destination identifier pair may also be aggregated with the first data packet and the second data packet. In some example embodiments, the determination that the two data packets are part of the single communication flow is based on analysis of the records created in a database for each data packet. In other example embodiments, the determination that the two data packets are part of the single communication flow is based on a comparison of the source and destination identifiers in the second data packet with the identifiers in the flow record.

In operation 1640, the detection module 580 of the detector 195, based on the single ID flow record stored in operation 1630, adjusts a resource allocation. For example, the single ID flow record created in operation 1630 may be one of the flow records accessed during execution of the method 1100, the method 1300, the method 1400, or the method 1500. In operation 1120, 1330, 1430, or 1530, a resource allocation may be adjusted. For example, in response to detection of a network attack in operation 1120 or detection of abuse of a mapping server in operation 1330, the resources of the GRIDS-MS 150 may be denied to an endpoint associated with the attack or abuse. As another example, in response to determination of poor quality of service in operation 1430, additional network resources may be allocated to an affected endpoint. As still another example, in response to determination of excessive use in operation 1530, fewer network resources may be allocated to an offending endpoint.

Devices and methods disclosed herein may reduce time, processor cycles, and power consumed in monitoring communication flows between entities. For example, processing power required by IPFIX systems that track communication between endpoints based on identities rather than based on IP addresses may consume less power than prior art systems (e.g., by requiring fewer processor cycles, smaller databases, or any suitable combination thereof). Devices and methods disclosed herein may also result in communication flow monitoring system, resulting in improved efficiency and an improved user experience.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A computer-implemented method of monitoring communication flows between identities, comprising:
   accessing, by one or more processors of a router, a first data packet that indicates a source identifier, a destination identifier, a first source locator, and a first destination locator;
   accessing, by the one or more processors of the router, a second data packet that indicates the source identifier, the destination identifier, a second source locator, and a second destination locator, the second destination locator being different from the first destination locator;
   accessing a first hash, the first hash having been generated from the source identifier of the first data packet;
   accessing a second hash, the second hash having been generated from the source identifier of the second data packet;
   accessing a third hash, the third hash having been generated from the destination identifier of the first data packet;
   accessing a fourth hash, the fourth hash having been generated from the destination identifier of the second data packet;
   storing, by the one or more processors of the router, data regarding the first data packet and the second data packet in a single ID flow record based on a determination that the source identifier of the first data packet matches the source identifier of the second data packet and a determination that the destination identifier of the first data packet matches the destination identifier of the second data packet, the single ID flow record including the first hash, the third hash, and a sum of sizes of the first data packet and the second data packet, the determination that the source identifier of the first data packet matches the source identifier of the second data packet comprising determining that the stored first hash matches the second hash, the determination that the destination identifier of the first data packet matches the destination identifier of the second data packet comprising determining that the stored third hash matches the fourth hash; and
   based on the single ID flow record, adjusting, by one or more processors of a detector, a resource allocation.

2. The computer-implemented method of claim 1, wherein the single ID flow record includes the source identifier and the destination identifier.

3. The computer-implemented method of claim 1, wherein:
   the accessing of the first hash comprises generating the first hash from the source identifier of the first data packet using a hashing algorithm;
   the accessing of the second hash comprises generating the second hash from the destination identifier of the first data packet using the hashing algorithm;
   the accessing of the third hash comprises generating the third hash from the source identifier of the second data packet using the hashing algorithm; and
   the accessing of the fourth hash comprises generating the fourth hash from the destination identifier of the second data packet using the hashing algorithm.

4. The computer-implemented method of claim 3, wherein:
   the source identifier and the destination identifier are variable-length identifiers;
   the generating of the first hash comprises generating a fixed-length hash of the source identifier of the first data packet; and
   the generating of the third hash comprises generating a fixed-length hash of the destination identifier of the first data packet.

5. The computer-implemented method of claim 1, wherein:
   the accessing of the first hash comprises retrieving, from a database, a predetermined hash of the source identifier of the first data packet;
   the accessing of the second hash comprises retrieving, from the database, a predetermined hash of the source identifier of the second data packet;
   the accessing of the third hash comprises retrieving, from the database, a predetermined hash of the destination identifier of the first data packet; and
   the accessing of the fourth hash comprises retrieving, from the database, a predetermined hash of the destination identifier of the second data packet.

6. The computer-implemented method of claim 1, further comprising:
   generating, based on an analysis of the ID flow record, an Internet protocol flow information export (IPFIX) message; and transmitting the generated IPFIX message over a network to the detector.

7. The computer-implemented method of claim 1, wherein the second source locator is different from the first source locator.

8. The computer-implemented method of claim 1, wherein the adjusting of the resource allocation comprises denying a request for a locator from a mapping server made by the source.

9. The computer-implemented method of claim 1, wherein the adjusting of the resource allocation comprises increasing network bandwidth on a network path between the source and the destination.

10. The computer-implemented method of claim 1, wherein the adjusting of the resource allocation comprises decreasing network bandwidth on a network path between the source and the destination.

11. An Internet protocol flow information export (IPFIX) router comprising:
a memory storage comprising instructions; and
one or more processors in communication with the memory storage,
wherein the one or more processors execute the instructions to perform:
accessing, by one or more processors, a first data packet that indicates a source identifier, a destination identifier, a first source locator, and a first destination locator;
accessing, by the one or more processors, a second data packet that indicates the source identifier, the destination identifier, a second source locator, and a second destination locator, the second destination locator being different from the first destination locator; and
accessing a first hash, the first hash having been generated from the source identifier of the first data packet;
accessing a second hash, the second hash having been generated from the source identifier of the second data packet;
accessing a third hash, the third hash having been generated from the destination identifier of the first data packet;
accessing a fourth hash, the fourth hash having been generated from the destination identifier of the second data packet;
storing, by the one or more processors of the router, data regarding the first data packet and the second data packet in a single ID flow record based on a determination that the source identifier of the first data packet matches the source identifier of the second data packet and a determination that the destination identifier of the first data packet matches the destination identifier of the second data packet, the single ID flow record including the first hash, the third hash, and a sum of sizes of the first data packet and the second data packet, the determination that the source identifier of the first data packet matches the source identifier of the second data packet comprising determining that the stored first hash matches the second hash, the determination that the destination identifier of the first data packet matches the destination identifier of the second data packet comprising determining that the stored third hash matches the fourth hash; and
based on the single ID flow record, adjusting a resource allocation.

12. The IPFIX router of claim 11, wherein the single ID flow record includes the source identifier and the destination identifier.

13. The IPFIX router of claim 11, wherein:
the accessing of the first hash comprises generating the first hash from the source identifier of the first data packet using a hashing algorithm;
the accessing of the second hash comprises generating the second hash from the destination identifier of the first data packet using the hashing algorithm;
the accessing of the third hash comprises generating the third hash from the source identifier of the second data packet using the hashing algorithm; and
the accessing of the fourth hash comprises generating the fourth hash from the destination identifier of the second data packet using the hashing algorithm.

14. The IPFIX router of claim 13, wherein:
the source identifier and the destination identifier are variable-length identifiers;
the generating of the first hash comprises generating a fixed-length hash of the source identifier of the first data packet; and
the generating of the third hash comprises generating a fixed-length hash of the destination identifier of the first data packet.

15. The IPFIX router of claim 11, wherein:
the accessing of the first hash comprises retrieving, from a database, a predetermined hash of the source identifier of the first data packet;
the accessing of the second hash comprises retrieving, from the database, a predetermined hash of the source identifier of the second data packet;
the accessing of the third hash comprises retrieving, from the database, a predetermined hash of the destination identifier of the first data packet; and
the accessing of the fourth hash comprises retrieving, from the database, a predetermined hash of the destination identifier of the second data packet.

16. The IPFIX router of claim 11, wherein the second source locator is different from the first source locator.

17. A non-transitory computer-readable medium storing computer instructions for monitoring communication flows between identities, that when executed by one or more processors of a router, cause the one or more processors to perform steps of:
accessing a first data packet that indicates a source identifier, a destination identifier, a first source locator, and a first destination locator;
accessing a second data packet that indicates the source identifier, the destination identifier, a second source locator, and a second destination locator, the second destination locator being different from the first destination locator;
accessing a first hash, the first hash having been generated from the source identifier of the first data packet;
accessing a second hash, the second hash having been generated from the source identifier of the second data packet;
accessing a third hash, the third hash having been generated from the destination identifier of the first data packet;
accessing a fourth hash, the fourth hash having been generated from the destination identifier of the second data packet;
storing data regarding the first data packet and the second data packet in a single ID flow record based on a determination that the source identifier of the first data packet matches the source identifier of the second data packet and a determination that the destination identifier of the first data packet matches the destination identifier of the second data packet, the single ID flow record including the first hash, the third hash, and a sum of sizes of the first data packet and the second data packet, the determination that the source identifier of the first data packet matches the source identifier of the second data packet comprising determining that the stored first hash matches the second hash, the determination that the destination identifier of the first data packet matches the destination identifier of the second data packet comprising determining that the stored third hash matches the fourth hash; and based on the single ID flow record, adjusting a resource allocation.

18. The non-transitory computer-readable medium of claim 17, wherein the single ID flow record includes the source identifier and the destination identifier.

* * * * *